(12) United States Patent
Yano

(10) Patent No.: US 8,041,574 B2
(45) Date of Patent: Oct. 18, 2011

(54) DIALOG APPARATUS, DIALOG METHOD, AND COMPUTER PROGRAM

(75) Inventor: Takehide Yano, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1064 days.

(21) Appl. No.: 11/857,151

(22) Filed: Sep. 18, 2007

(65) Prior Publication Data

US 2008/0082692 A1  Apr. 3, 2008

(30) Foreign Application Priority Data

Sep. 29, 2006  (JP) ................................. 2006-267981

(51) Int. Cl.
*G10L 21/00* (2006.01)
(52) U.S. Cl. ........................................ 704/270; 704/275
(58) Field of Classification Search .................. None
See application file for complete search history.

(56) References Cited

U.S. PATENT DOCUMENTS

| | | | |
|---|---|---|---|
| 6,427,227 B1 * | 7/2002 | Chamberlain | 717/124 |
| 6,985,852 B2 * | 1/2006 | Wang | 704/9 |
| 7,165,202 B2 * | 1/2007 | Eatough et al. | 714/746 |
| 7,228,278 B2 * | 6/2007 | Nguyen et al. | 704/257 |
| 7,461,000 B2 * | 12/2008 | Davis et al. | 704/275 |
| 2002/0178005 A1 * | 11/2002 | Dusan et al. | 704/254 |
| 2005/0246174 A1 * | 11/2005 | DeGolia | 704/270 |
| 2007/0043571 A1 * | 2/2007 | Michelini et al. | 704/270.1 |

FOREIGN PATENT DOCUMENTS

| | | |
|---|---|---|
| JP | 2004-212664 | 7/2004 |
| JP | 2004-234273 | 8/2004 |
| JP | 2006-107081 | 4/2006 |

OTHER PUBLICATIONS

Toshihiro Kujirai, et al. "Development of Dialogue Platform for Car Information Terminal", IPSJ Forum on Information Technology (FIT), pp. 215-216, 2003.

* cited by examiner

*Primary Examiner* — Matthew Sked
(74) *Attorney, Agent, or Firm* — Oblon, Spivak, McClelland, Maier & Neustadt, L.L.P.

(57) ABSTRACT

A dialog apparatus includes a dialog unit configured to perform a dialog with a user and to collect a plurality of items to be referred to in accordance with the dialog as the dialog continues, a dividing unit configured to divide the items into normal items related to any usable application and unusable items related to any usable application deleted, a managing unit configured to manage the items which the dialog unit refers to during the dialog with the user, in the normal items and the unusable items, an applying unit configured to apply a plurality of changes in the items to managing of the normal items and the unusable items, and a referring unit configured to refer to the managing unit in accordance with the items collected by the dialog unit and to determine to output a use-disapproval notice when the collected items include at least one unusable item.

18 Claims, 19 Drawing Sheets

- Destination setting (destination : φ) ···301
- Facility reservation (shop : φ, seat : no-smoking) ···302
- Restaurant retrieval (retrieval genre : japanese cuisine) ···303
- Local restaurant retrieval (retrieval genre : japanese cuisine) ···304
- Destination setting (destination : restaurant retrieval (retrieval genre : φ)) ···305

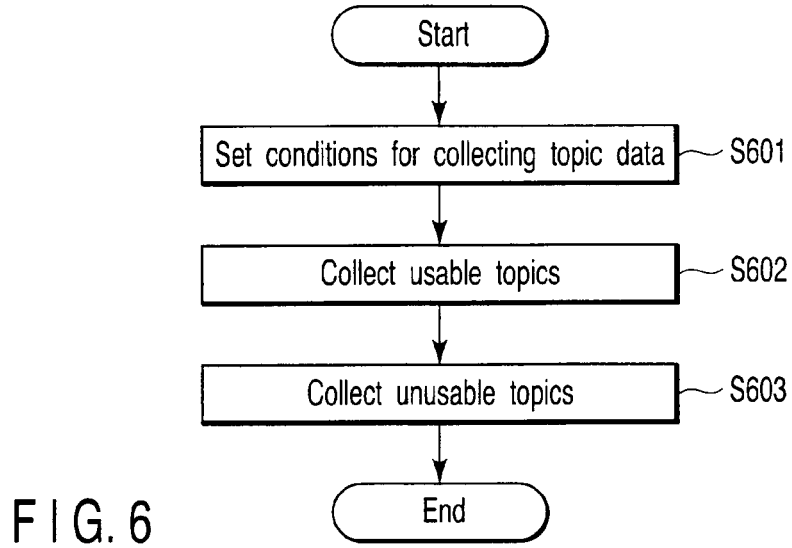

FIG. 6

FIG. 7
- URS7-1 : Restaurant
- SYS7-1 : You cannot use local restaurant retrieval
- SYS7-2 : You can use restaurant retrieval
- SYS7-3 : Designate the genre, please
- USR7-3 : Japanese cuisine
- SYS7-4 : Japanese restaurant X is available
- SYS7-5 : You cannot use facility reservation
- SYS7-6 : You can set japanese restaurant X as destination FIG. 8
- USR8-1 : Local restaurant retrieval
- SYS8-1 : You cannot use local restaurant retrieval {
USR9-1 : Set destination
SYS9-1 : Destination shall be set
SYS9-2 : You cannot use local restaurant retrieval
SYS9-3 : You can use restaurant retrieval
}

- USR20-1: Facility data retrieval
- SYS20-1: You cannot use restaurant B
- SYS20-2: Designate facility name, please

- USR21-1: Restaurant B
- SYS21-2: You cannot use restaurant B

- USR24-1: Restaurant
- SYS24-1: You can use restaurant retrieval
- SYS24-2: Designate the genre
- USR24-2: Local restaurant retrieval ?
- SYS24-3: You cannot use local restaurant retrieval

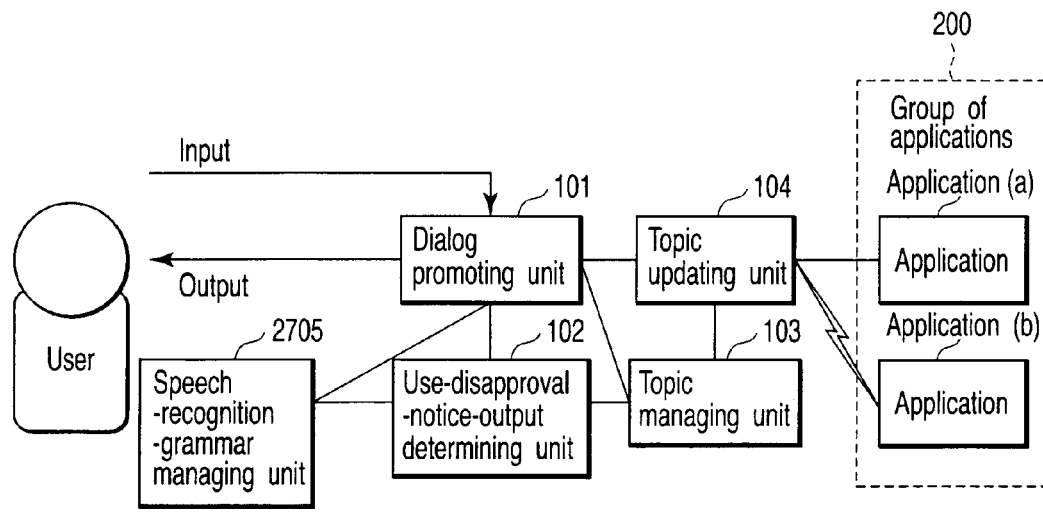
F I G. 27
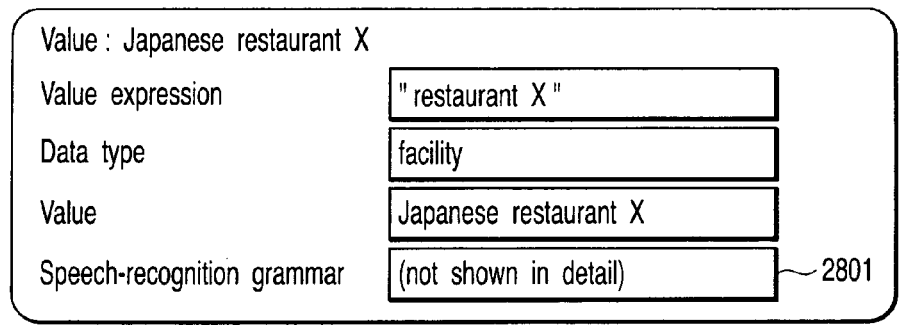
F I G. 28

DIALOG APPARATUS, DIALOG METHOD, AND COMPUTER PROGRAM

CROSS-REFERENCE TO RELATED APPLICATIONS

This application is based upon and claims the benefit of priority from prior Japanese Patent Application No. 2006-267981, filed Sep. 29, 2006, the entire contents of which are incorporated herein by reference.

BACKGROUND OF THE INVENTION

1. Field of the Invention

The present invention relates to a dialog apparatus, a dialog method and a computer program, each configured to inform a user that an application cannot be used in a system, when the application is deleted from the system that can operate a plurality of applications.

2. Description of the Related Art

Systems have hitherto been available, in each of which various applications can be operated. For example, a cellular telephone is a system that can operate a plurality of services (i.e., applications) on a network. Other systems of this type have been developed, such as the car-navigation system into which applications can be downloaded via a cellular telephone. In such a system, the user or the system manager can add new applications and delete some applications, thereby to change the composition of the group of applications.

JP-A 2004-234273 (KOKAI) discloses a method of operating such a system through a natural-language dialog. In this method, the speech-recognition grammar and dialog-promoting procedure are defined for each application. When an application is added or changed, the speech-recognition grammar and new dialog-promoting procedure for the application are added or updated. In this method, as an application is added, the corresponding speech-recognition grammar and new dialog-promoting procedure are added. Thus, when an application is added, an oral dialog can be performed in connection with the application added.

In the method disclosed in JP-A 2004-234273 (KOKAI), the addition and change of applications are indeed defined. However, nothing is defined as to the case where any application becomes not usable (is deleted). Hence, if an application is deleted against the user's intention, the user thinks the application has not been deleted. Consequently, misunderstanding arises on the part of the user, with regard to the existence of the application. For example, the system manager may delete an application that the user can use in the system. In this case, the user thinks that the application can be used, nevertheless. Assume that an access to the application stored in a server is prohibited at the server side. Then, the application cannot be used at all, as if it had been deleted against the user's intention. Even if the user intentionally deletes the application, he or she may forget this fact. Once such misunderstanding has arisen about the application, the user may operate the input device to access the application, though he or she cannot use it at all.

To operate a system in which applications can be deleted, by using a natural language, some measures should be taken against inputs about any application deleted. That is, the inputs about the application must be inhibited. In the conventional system, when an application is added, the dialog-promoting procedure for the application is added. Similarly, when an application is deleted, together with the dialog-promoting procedure for it, dialog-promoting procedures that can respond to an input about the application do not exist at all. Consequently, the system will malfunction if the user operates the input device to access the application that has been deleted. It is therefore necessary to inform the user that the application has been deleted, so that the user may realize that he or she can no longer use the application.

To make the user recognize the deletion of an application, a notice of application deletion may be given the moment the application is deleted. Then, the notice is issued, irrespective of the progress of the dialog with the user. Such a notice often interferes with the dialog with the user. Besides, the notice may fail to make the user recognize the deletion of the application if the application deleted is not so interesting to the user. As a consequence, the user will repeatedly operate the input device in an attempt to access the application that has been deleted. Inevitably, the system will keep malfunctioning.

BRIEF SUMMARY OF THE INVENTION

In accordance with an aspect of the invention, there is provided a dialog apparatus comprising: a dialog unit configured to perform a dialog with a user and to collect a plurality of items to be referred to in accordance with the dialog as the dialog continues; a dividing unit configured to divide the items into normal items related to any usable application and unusable items related to any usable application deleted; a managing unit configured to manage the items which the dialog unit refers to during the dialog with the user, in the normal items and the unusable items; an applying unit configured to apply a plurality of changes in the items to managing of the normal items and the unusable items; and a referring unit configured to refer to the managing unit in accordance with the items collected by the dialog unit and to determine to output a use-disapproval notice when the collected items include at least one unusable item.

BRIEF DESCRIPTION OF THE SEVERAL VIEWS OF THE DRAWING

FIG. 6 is a flowchart explaining in detail how the first embodiment operates;

FIG. 7 is a diagram showing an example of a dialog performed in the first embodiment;

FIG. 8 is a diagram showing another example of a dialog performed in the first embodiment;

FIG. 27 is a diagram showing another configuration the first embodiment may have to utilize speech recognition;

FIG. 28 is a diagram showing, in detail, an example of name data that is configured in consideration of speech input in the second embodiment;

DETAILED DESCRIPTION OF THE INVENTION

Dialog apparatuses, dialog methods, and programs, all according to the embodiments, will be described with reference to the accompanying drawings.

Any dialog apparatus according to the embodiments may be used as a user interface for applications. The apparatus is designed to make any application to perform an effective function. The dialog apparatus according to the embodiments particularly achieves one or more objects in order to make an application to perform one or more functions. To achieve the objects, the apparatus performs dialogs with the user about topics related to the objects, respectively.

The embodiments can provide a dialog apparatus that gives the user a notice as the dialog with the user proceeds, effectively informing the user that an application can no longer be used.

First Embodiment

Figure 1:
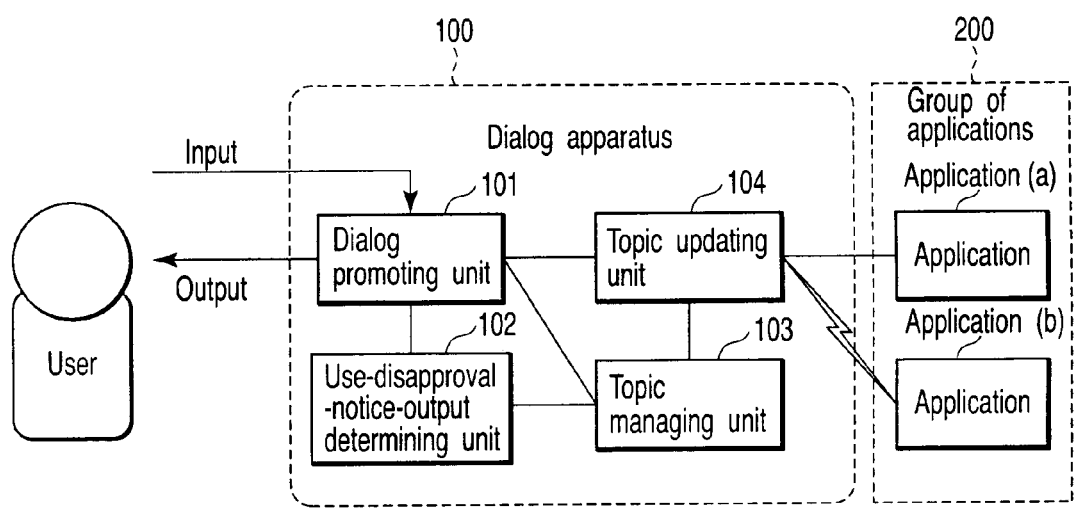
FIG. 1 is a diagram showing the configuration of a first embodiment.

FIG. 1 is a block diagram showing a dialog apparatus according to the first embodiment.

As shown in FIG. 1, the dialog apparatus 100 has a dialog promoting unit 101, a use-disapproval-notice-output determining unit 102, a topic managing unit 103, and a topic updating unit 104.

The dialog promoting unit 101 performs a dialog with the user, over a topic (item), thereby achieving the aim of the topic (that is, solving problem concerning the topic). The dialog promoting unit 101 manages the topic data as data representing the present state of the dialog. The topic data contains data representing the type of the topic and data representing the present stage of the dialog. The dialog promoting unit 101 talks with the user about the topic represented by the topic data it manages. The unit 101 then solves the problem concerning the topic (i.e., topic being talked about). In the course of the dialog with the user, the dialog promoting unit 101 interprets inputs, thereby correlating the user's speech to the topic data, and performs a dialog-prompting process, such as generating a send prompt. The send prompt is given to the user, in the form of an audio signal, a text message, or an image message. If the dialog promoting unit 101 solves the problem concerning the present topic, it activates an application on the basis of the topic data it manages at the time of solving the problem. An example of the topic data will be described later in detail.

Upon determining that a new topic should be introduced while the dialog is proceeding, the dialog promoting unit 101 collects topics that may be talked about next (i.e., topics to which the dialog may be switched). In the process of collecting such topics, the dialog promoting unit 101 collects, from the topic managing unit 103, any topics to which the dialog may be switched and which have been selected from all topics including those that cannot be talked about because an application has been deleted. How to determine whether a new topic should be introduced will be explained later in detail.

The dialog promoting unit 101 informs the use-disapproval-notice-output determining unit 102 of the topics to which the dialog may be switched and acquires the decision made by the unit 102, such as the content of a use-disapproval notice. In accordance with the decision, the dialog promoting unit 101 outputs a use-disapproval notice to the user. The dialog promoting unit 101 then determines topic data (i.e., new topic data) on the basis of the topics which have been collected and to which the dialog may be switched next. This topic data is applied to the present topic data (over-written on, or substituted for, the present topic data). The dialog with the user is thereby continued.

The dialog promoting unit 101 interprets inputs. More precisely, the unit 101 interprets the natural-language speech the user has input, thus converting the user input to topic data or a specific value. For example, if the user inputs the title of the topic, the unit 101 will convert the user input to topic data in the initial state. If the user designates a value as an operation condition, the unit 101 will apply information (data type) representing the type of the value, such as part-of-speech information. Even if the user input does not contain the topic title, the unit 101 may covert the user input to topic data representing the topic being talked about, provided that a specific condition has been designated for the topic. This natural-language interpretation system can be one that is available at present.

The dialog promoting unit 101 prompts the dialog, referring to the dialog-promoting procedures allocated to the topics stored in the topic managing unit 103 and to the topic data representing how the dialog is proceeding now. When the dialog-promoting procedure comes to an end, the dialog promoting unit 101 determines that the problem concerning the topic has been solved. This dialog process, wherein the problem concerning each topic is solved, can be performed by various methods that are available at present. One method is to continue the dialog with reference to a scenario, e.g., a dialog-transition diagram correlated to the topic, and to determine that the problem concerning the topic has been solved, when the dialog proceeds to the end. Another method is to detect information required, to request the user to provide this information, and to determine that the problem concerning the topic has been solved, when no further information becomes necessary. Responses made to the user during the dialog can be output in the form of a sign representing the information to be input and emphatically displayed on the screen or in the form of a message displayed on the screen. The response message can be automatically formed in a preset pattern or a template, either accompanying the scenario, as in the method that is already available.

The use-disapproval-notice-output determining unit 102 acquires the topics that may be talked about next, from the dialog promoting unit 101. The unit 102 then determines the content of the use-disapproval notice. How the use-disapproval-notice-output determining unit 102 operates will be described later in detail.

The topic managing unit 103 manages the topics that can be used at present and also the topics that cannot be used at present. Each topic has data that is referred to make the dialog about the topic proceed and contains an expression specific to the topic. The topic managing unit 103 and the topics will be described later in detail.

The topic updating unit 104 manages the composition of the group 200 of applications, the execution of which can be designated from the dialog apparatus 100. Whenever the composition of the group 200 of applications is changed, the unit 104 applies this change to the topic managing unit 103. For example, an application that can be used may be added to the group 200. Then, the topic updating unit 104 supplies the topics related to the application, to the topic managing unit 103. An application that can be used may be deleted from the group 200. In this case, the topic updating unit 104 disables the topics related to this application from being used. The group 200 managed by the topic updating unit 104 may consist of either (a) applications that can be accessed within the system or (b) applications than can be accessed via networks. The topic updating unit 104 will be described later in detail.

Figure 2:
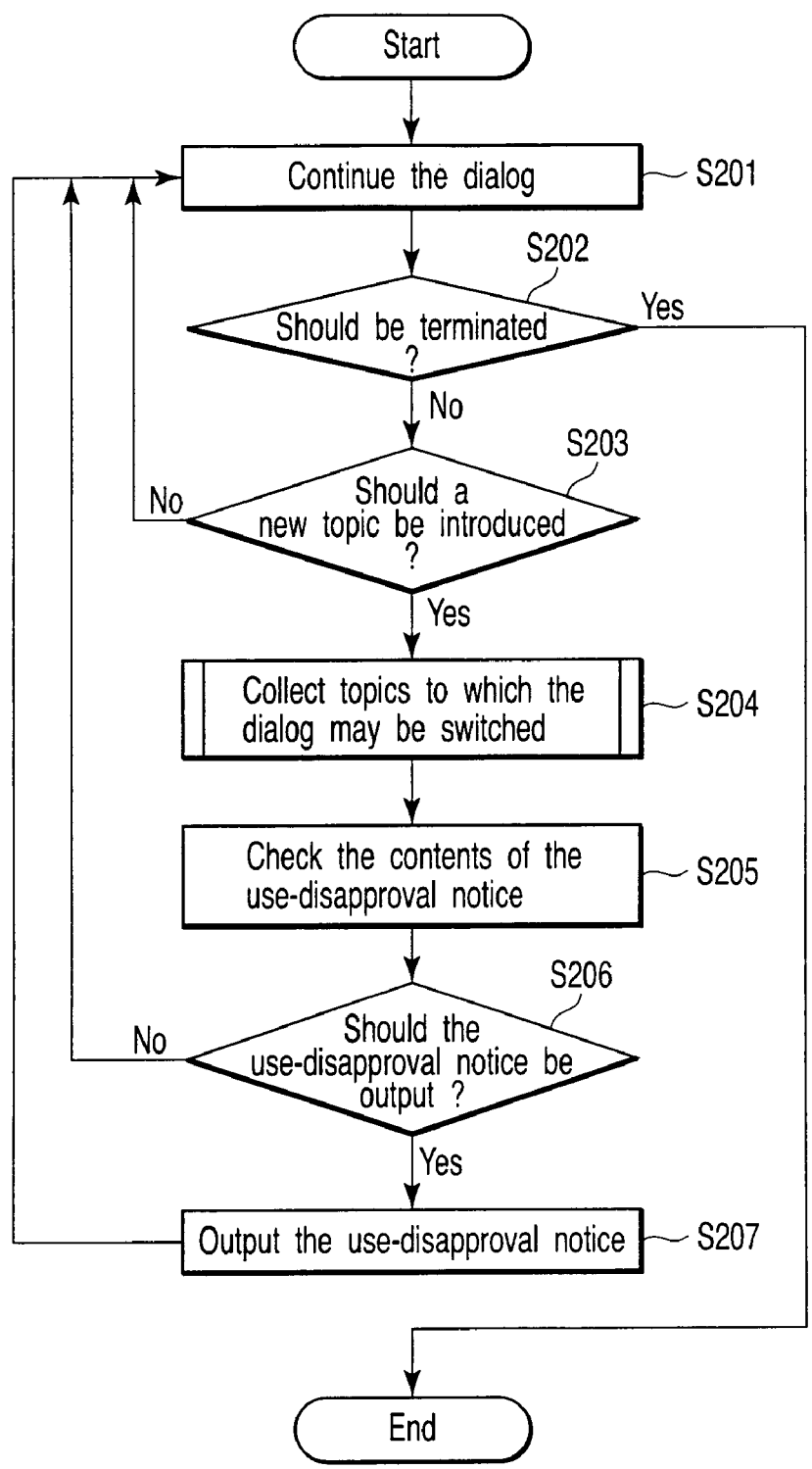
FIG. 2 is a flowchart explaining how the first embodiment operates.

How the dialog apparatus 100 operates according to the first embodiment will be explained, with reference to FIG. 2. FIG. 2 is a flowchart explaining the operation of the dialog apparatus 100.

The dialog apparatus 100 is configured to perform a dialog with the user about a particular topic. "Start" shown in FIG. 2 is the step at which the user or the dialog apparatus 100 starts the dialog. The dialog is terminated when it becomes no longer necessary. That is, it is terminated in the step "End" shown in FIG. 2.

When the dialog apparatus 100 starts a dialog with the user, the dialog promoting unit 101 designates the topic data available at this time, as present topic data (Step S201). Thus, the apparatus 100 talks about this topic with the user. As the dialog proceeds, the dialog apparatus 100 may output a system response to the user and then wait for a user input. This state can be said to be a temporary suspension of the dialog, which lasts until a user input is made in Step S201. When the dialog apparatus 100 receives a user input, a timer event, or the like, the process at Step S201 keeps going. As the dialog thus proceeds, the dialog promoting unit 101 determines, at intervals, whether the dialog with the user should be terminated (Step S202) and whether new topic data should be introduced (Step S203). If the unit 101 determines that the dialog should be terminated, it terminates the dialog-prompting process (End). If no new topic data has been introduced (or found), or if the user has notified that he or she wants to terminate the dialog, the dialog promoting unit 101 determines that the dialog should be terminated at intervals during the dialog. If it is determined new topic data need not be introduced, the dialog promoting unit 101 continues the dialog in order to solve the problem concerning the present topic (Step S201). If it is determined that new topic data should be introduced, the dialog promoting unit 101 collects from the topic managing unit 103 the topics to which the dialog may be switched (Step S204).

It will be explained how it is determined whether a new topic should be introduced (in Step S203). The dialog promoting unit 101 may introduce a new topic at one of three timings: (A) when the user inputs a topic different from the present topic; (B) when it is determined that a topic other than the present topic should be used as a sub-goal for solving the problem concerning the present topic; and (C) when a topic is selected after the problem concerning the present topic has been solved. Thus, at the timing (A), (B) or (C), the dialog promoting unit 101 determines that new topic data should be introduced and selects a method of collecting topics.

Next, in Step S205, the content of the use-disapproval notice is determined from the topics which have been collected in Step S204 and to which the dialog may be switched. Steps S204 and S205 will be describe later in detail.

Then, it is determined whether the use-disapproval notice should be output (Step S206). If it is determined that the use-disapproval notice should be output (that is, if Yes in Step S206), the dialog promoting unit 101 outputs the use-disapproval notice (Step S207). As a result, the dialog with the user is continued (Step S201). If it is not determined that the use-disapproval notice should be output (that is, if No in Step S206), the dialog with the user is continued, too (Step S201).

The topic data the dialog apparatus 100 refers to will be explained in detail, with reference to the example shown in FIG. 3.

Figures 3, 4:
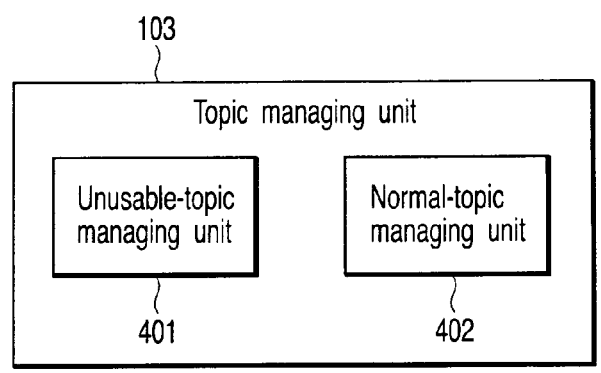
FIG. 3 is a diagram explaining dialog-topic data used in the first embodiment.
FIG. 4 is a diagram showing the configuration of the topic managing unit used in the first embodiment.

The topic data shown in FIG. 3 consists of topic-data items 301 to 305. The item 301 is "destination setting". The item 302 is "facility reservation". The item 303 is "restaurant retrieval". The item 304 is "local restaurant retrieval". The item 305 is "destination setting". These topic-data items 301 to 305 represent information related to at least the type of topic and the proceeding of the dialog on the topic. The data about the dialog that is proceeding depends on the method of designating the dialog-promoting procedures allocated to the respective topics. If the dialog-promoting procedure is designated in accordance with a scenario such as a dialog-transition diagram, the data will correspond to a node which the dialog transits. If the dialog needs some data to solve the problem, the data will be a list of the items required for the solution. The topic data used in the embodiment and the description of the topic data will be explained, with reference to FIG. 3. The topic data can be divided into a name and arguments, i.e., "(name of argument): (value of argument)". The name is data representing the type of the dialog and described on the left of "(" and may be "destination setting" or "restaurant retrieval". The arguments are attributes that the dialog apparatus 100 must acquire from the user through the dialog and are described in the parentheses "( )". The number of arguments differs, depending on the topic. The arguments are marked off by commas ",". Each argument is defined by a name identifying the attribute and a value designated for the attribute through the dialog in the dialog. The name and the value will be referred to as "attribute name" and "attribute value", respectively. If the argument has acquired no attribute values, "φ" will be stored as attribute value. For example, the topic data 302 contains an attribute value "φ" as shown in FIG. 3. This means that the value "no-smoking" has been obtained from the user as a facility attribute in the topic "facility reservation". The topic data 301 shown in FIG. 3 has no attribute values. To obtain attribute values for particular topic data, another topic data may be utilized. If this is the case, the other topic data is stored, within the attribute value to be obtained. For example, the topic data 305 indicates that the location has been determined by using the topic "restaurant retrieval" in the topic "destination setting". Note that any topic data may consist of only the name if no detailed attributes are necessary.

An example of a method in which the dialog promoting unit 101 may perform the dialog process by using the topic data shown in FIG. 3 will be described. The attributes of topic data may include two types of topic-data items. The topic-data items of one type must be acquired to solve the problem concerning the topic. The topic-data items of the other type need not be acquired for the same purpose. If the present topic data includes any necessary attribute whose attribute value has not been designated, the dialog promoting unit 101 operates to acquire an attribute value that should be added to the necessary attribute. More specifically, the dialog promoting unit 101 requests the user to input an attribute value for the necessary attribute and add the attribute value, thus obtained, to the necessary attribute. If the attribute value needed is data (e.g., data representing the present time) that can be obtained freely from the user, the dialog promoting unit 101 obtains it without requesting the user for it. In the course of requesting the user to input such an attribute value, the dialog promoting unit 101 may need to use another topic. In this case, the unit 101 obtained the corresponding dialog data from the topic managing unit 103 and then performs a dialog with the user about the topic. The unit 101 then uses the outcome of the dialog as attribute value. In the case of a simple command, the topic data may contain no attributes (i.e., number of attributes=0). If the topic is of this type, all necessary attributes are regarded as having been designated. When the topic data becomes complete with all attributes required, it is determined that the problem concerning the topic has been solved. For the same of simplicity, the following description is based on the assumption that all attributes of each topic data are necessary ones and that the problem concerning the topic is solved if all attributes have been designated.

The topic managing unit 103 and the topic updating unit 104 will be described in detail, with reference to FIGS. 4 and 5.

As FIG. 4 shows, the topic managing unit 103 comprises two types of databases, i.e., an unusable-topic managing unit 401 and a normal-topic managing unit 402. The unusable-topic managing unit 401 is a database that manages the unusable topics related to any application deleted. The normal-topic managing unit 402 is a database that manages the topics related to any application that can be used in the dialog apparatus 100. The topics will be explained later in detail.

The topic updating unit 104 updates the topic managing unit 103 as any changes occurs in connection with usable applications. Upon detecting that any usable application has been added during the dialog, the unit 104 adds topics related to the application to the normal-topic managing unit 402. When any usable application is deleted, the unit 104 transfers the topics related to the application from the normal-topic managing unit 402 to the unusable-topic managing unit 401.

Figure 5:
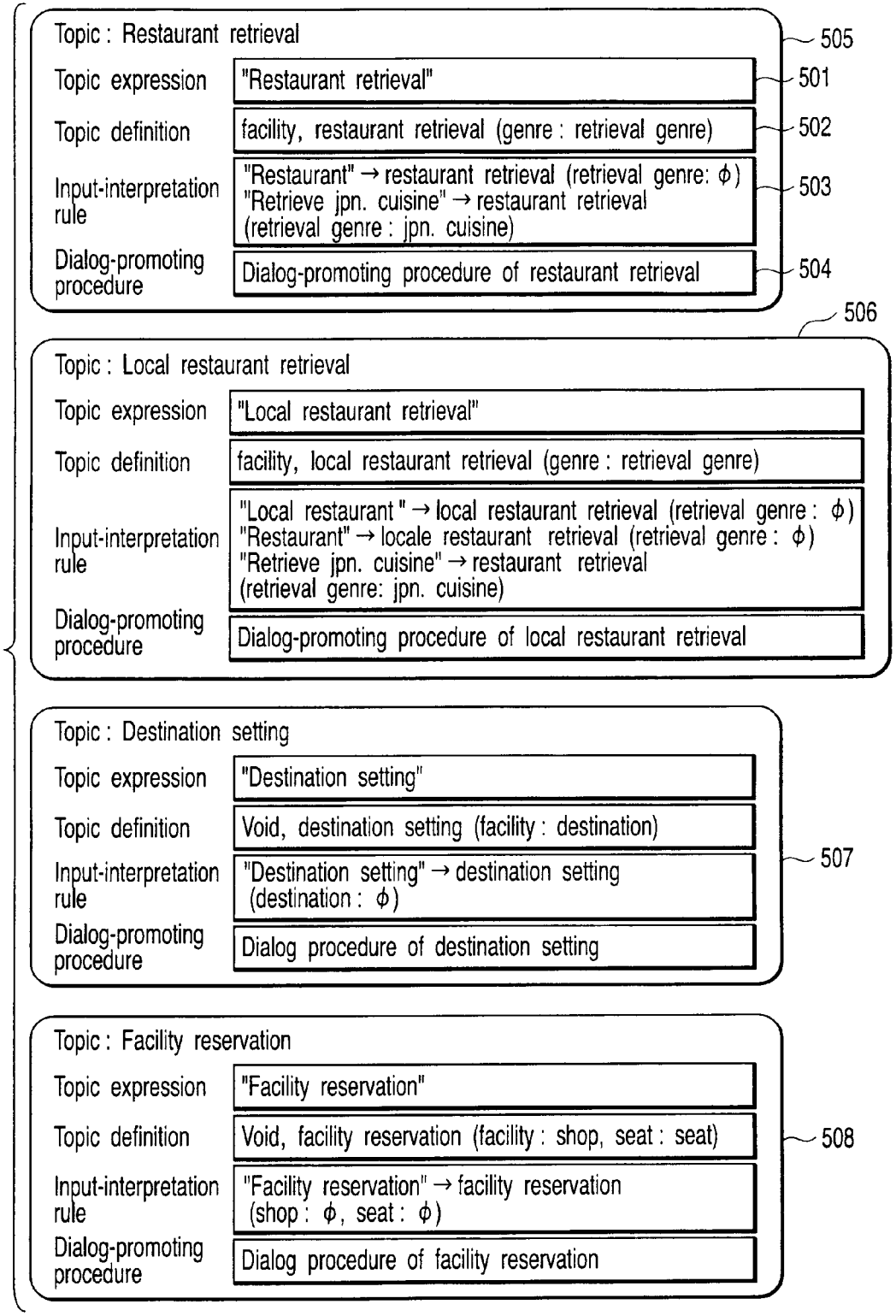
FIG. 5 is a diagram explaining some topics for dialogs performed in the first embodiment.

FIG. 5 shows, in detail, some examples of topics that are used in this embodiment. Each of the topics (505, 506, 507 and 508) shown here includes a topic expression (e.g., 501), a topic definition (e.g., 502), an input-interpretation rule (e.g., 503), and a dialog-promoting procedure (e.g., 504).

The topic expression 501 designates the expression of the topic. The topic expression 501 is used in a use-disapproval notice or the like, as an expression that designates the topic. The topic definition 502 is data that is used as template of topic data. In the embodiment, the topic definition 502 is described as "output-data type, name of topic (data type: argument name, . . . )". The output-data type specifies the type of the data newly acquired when the problem concerning the topic is solved. In the topic "restaurant retrieval", for example, it specifies "facility". This is because, in the topic "restaurant retrieval", retrieval conditions are acquired through the dialog with the user and the result of retrieval, i.e., restaurant is acquired, thus solving the problem in the dialog. Thus, the output-data type designates "facility". Output-data type "Void" means that no new data can be acquired even if the problem concerning the topic is solved. To define each argument, the data type and name the argument can assume are stored, as paired data items. If the dialog promoting unit 101 determines that a dialog on the topic "restaurant retrieval" has been started, it refers to the topic definition 502, prepares topic data "restaurant retrieval (retrieval genre: φ)", and uses this data as present topic data. The value of the genre type, i.e., the data type designated by the topic definition 502, can be substituted in the argument "retrieval genre".

The input-interpretation rule 503 is a rule of converting the expression input, to topic data representing the topic designated by the expression. In the embodiment, the rule 503 is expressed in the format of "input expression→the result of conversion". The dialog promoting unit 101 proceeds with the dialog, while referring to the topic data, i.e., the result of conversion. The input expression "restaurant" agrees with the input-interpretation rule 503. It is therefore converted to "restaurant retrieval (genre: φ)".

The dialog-promoting procedure 504 contains a procedure and rules for promoting the dialog with the user about the topic. The dialog-promoting procedure may be a transition table that shows, for example, the state in which the dialog is proceeding. Nonetheless, the dialog-promoting procedure will not be described in detail, because it is data not essential to the embodiment.

How the dialog promoting unit 101 operates in Step S204 shown in FIG. 2 will be explained in detail, with reference to FIG. 6. FIG. 6 is a flowchart explaining Step S204 in detail. In Step S204, the dialog promoting unit 101 acquires topics to which the dialog may be switched when it determines that new topic data is required. As shown in FIG. 6, the dialog promoting unit 101 first sets conditions for collecting topic data (Step S601). The method of collecting topic data depends on the pattern of determining the necessity of new topic data. Step S601 will be described later in detail. Then, in Step S602, the topics that accord with the data-collecting conditions set in Step S601 are collected from the normal-topic managing unit 402. In Step S603, the topics that accord with the topics collected in Step S602 are collected. The topics collected in Step S602 are output as "normal-topic group", and the topics collected in Step S603 are output as "unusable-topic group". Thus, two types of data items collected are output, as the results of data collection.

Step S601 will be explained in detail. Step S601 is performed if the dialog promoting unit 101 determines in Step S203 that new topic data is required. The necessity of new topic data can be determined in three patterns: (A) when the user inputs any topic different from the present topic; (B) when it is determined that a topic other than the present topic should be used as a sub-goal for solving the problem concerning the present topic; and (C) when a topic is selected after the problem concerning the present topic has been solved. In Step S601, one of three data-collecting conditions is set in accordance with pattern (A), pattern (B) or pattern (C). A method of setting the data-collecting condition will be explained, on the assumption that the condition is set by using the above-mentioned topic data (FIG. 3) and the detailed topic data (FIG. 5).

The pattern (A) is confirmed when a user input is made. If the user input is not related to the topic that is proceeding at present, it is determined that the user has introduced a new topic to the dialog. It is therefore determined that a new topic should be introduced. In this pattern, it suffices to select, as a new topic, the topic designated by the user. Therefore, the data-collecting condition is set in Step S601 so that topics for which an input-interpretation rule can be applied to the user input may be collected. For example, an input-interpretation rule (e.g., rule 503 shown in FIG. 5) may be applied to the user input "restaurant", thereby changing the topic data to "restaurant retrieval (retrieval genre: φ)" or "local restaurant retrieval (retrieval genre: φ)". In this case, "restaurant retrieval" and "local restaurant retrieval" of the topic group shown in FIG. 5 accord with the data-collecting condition.

The pattern (B) is confirmed when the dialog promoting unit 101 determines the content of the system response. When the dialog promoting unit 101 determines the argument (subgoal) that should be acquired in order to solve the problem concerning the present topic, it is determined that a new topic should be introduced to acquire the argument. In this pattern, it suffices to select a new topic that can get the value of the argument. Hence, in Step S601, a data-collecting condition is set to collect such a topic that the topic definition (e.g., topic definition 502 shown in FIG. 5) agrees with the argument to acquire, in terms of data type. In the case of acquiring, for example, "facility", i.e., the argument of the topic "destination setting", the topics "restaurant retrieval" and "local restaurant retrieval" meet the data-collecting condition, because these topics are of output-data type "facility" in the topic group shown in FIG. 5.

The pattern (C) is confirmed when the dialog promoting unit 101 determines the content of the system response. When the dialog promoting unit 101 solves the problem concerning the present topic, it is determined that a new topic should be introduced in order to switch the dialog to another topic that can use the outcome of the dialog. In this pattern, it suffices to select a topic that naturally follows the topic for which the problem has been solved. For example, a topic may be selected, to which the dialog can be switched by using the outcome of the dialog about the preceding topic. In this method, topic data which represents the topic data and in which the argument is substituted by the outcome of the dialog can be generated and used as the present topic data. Therefore, in Step S601, a data-collecting condition is selected so that the argument of the topic definition (e.g., 502 shown in FIG. 5) of the topic and the outcome of the dialog may be identical in terms of data type. If the outcome of dialog, for example "restaurant A", is obtained when the problem concerning the topic "restaurant retrieval" is solved, the topics "destination setting" and "facility reservation", both belonging to the topic group shown in FIG. 5, will meet the data-collecting condition as new topics, because they have an argument whose data type is "facility".

How the use-disapproval-notice-output determining unit 102 performs Step S205 will be described in detail. Data composed of a normal-topic group and an unusable-topic group, which has been collected, is supplied from the dialog promoting unit 101. In this embodiment, the unit 102 determines that a use-disapproval notice should be output for the topics included in the unusable-topic group unless the unusable-topic group is empty.

Step S207 will be explained. The use-disapproval notice shows the user that topics notified cannot be used. To generate the output content, a topic expression is substituted in "(topic expression)" of a template such as "(topic expression) cannot be used", and a text message may be generated. The method of outputting the use-disapproval notice is not essential to the embodiment. The notice can be output by various methods, including the representation of images or the like.

With reference to FIG. 2 and FIGS. 5 to 10, it will be explained in detail how the present embodiment operates if it is applied to a dialog system that utilizes restaurant retrieval service. In the dialog system, a dialog can continue over four topics, which are "restaurant retrieval", "local restaurant retrieval", "destination setting", and "facility reservation". The topic "restaurant retrieval" is talked about to search for restaurants. The topic "local restaurant retrieval" is concerned with more detailed data about restaurants and can retrieve restaurants in more detail. The topic "destination setting" is talked about so that the user may find a way to one facility. The topic "facility reservation" is talked about so that the user can reserve one facility. FIG. 5 illustrates these topics in detail. The following description is based on the assumption that the topics "local restaurant retrieval" and "facility reservation" cannot be used (see FIG. 10). Hence, the normal-topic managing unit 402 stores programs for "facility setting" and "restaurant retrieval", and the unusable-topic managing unit 401 stores programs for "facility reservation" and "local restaurant retrieval".

Dialog Example 1

An example of a dialog will be explained, with reference to FIG. 7.

In this dialog, a use-disapproval notice is output in the pattern (A) or the pattern (C). First, the dialog starts with a user-call USR7-1 (Step S201). If a user input is received in the initial state, the dialog promoting unit 101 does not determine that the dialog with the user should be terminated (that is, No in Step S202). Then, the dialog promoting unit 101 determines at intervals whether a new topic data should be introduced, as it receives a user input in the pattern (A) (Step S203). Since the present topic data is not registered in the dialog promoting unit 101 in the initial state, the user input is discriminated as introduction of a new topic (Yes in Step S203).

The dialog promoting unit 101 collects topics to which the dialog may be switched (Step S204). If new topic data is introduced in the pattern (A), a data-collecting condition is set so that topics having an input-interpretation rule that may be applied to the user-call USR7-1 ("restaurant") may be collected (Step S601). In accordance with this data-collecting condition, such topics are collected from the normal-topic managing unit 402, thereby obtaining a normal-topic group {"restaurant retrieval"} (Step S602). Next, topics having such an input-interpretation rule are collected from the unusable-topic managing unit 401 in the same data-collecting condition, thus obtaining an unusable-topic group (={"local restaurant retrieval"}) (Step S603). The topics collected, to which the dialog may be switched, are a normal topic (={"restaurant retrieval"}) and an unusable topic (={"local restaurant retrieval"}). Note that "{ }" is the notation of a list.

The use-disapproval-notice-output determining unit 102 determines whether a use-disapproval notice should be output, on the basis of the topics the dialog promoting unit 101 has collected (Step S205). Since the unusable-topic group collected includes "local restaurant retrieval", the unit 102 determines that a use-disapproval notice should be output to the user to inform him or her that "local restaurant retrieval" cannot be used.

It has been determined that a use-disapproval notice should be output (Yes in Step S206). Therefore, the dialog promoting unit 101 outputs a use-disapproval notice (SYS7-1) showing that "local restaurant retrieval cannot be used" (Step S207). Thereafter, the unit 100 proceeds with the dialog with the user (Step S201).

In Step S201, the dialog promoting unit 101 performs such a process as will be described below. The normal-topic group, i.e., the topics to which the dialog may be switched, consists of only one topic "restaurant retrieval". Hence, the unit 101 outputs a notice (SYS7-2), informing the user that the user can use the topic "restaurant retrieval". Then, the unit 101 sets topic data in an initial state, i.e., "restaurant retrieval (retrieval genre: φ)", as present topic data, and then determines that the argument "retrieval genre" not acquired yet should be obtained.

Upon finding the value of the argument "retrieval genre", the dialog promoting unit 101 determines that new topic data should be introduced in the pattern (B) (Yes in Step S203). In this case, the type of the data to acquire is genre type. A data-collecting condition is set so that topics whose output-data type is genre type may be collected (Step S601). However, there are no topics whose output-data type is genre type. Consequently, the topics collected, to which the dialog may be switched, are a normal-topic group (={ }) and an unusable-topic group (={ }) (Steps S602 and S603).

The use-disapproval-notice-output determining unit 102 determines that a use-disapproval notice should not be output, because the unusable-topic group obtained is empty (S205, and No in Step S206). Then, the dialog promoting unit 101 performs Step S201 again. Since there are no topics that may be used to acquire the argument "retrieval genre", the dialog promoting unit 101 does not introduce a new topic and prompts the user to input a genre (SYS7-3). The unit 101 then waits for a user input. Thus, Step S201 is temporarily suspended.

User input USR7-3 is then input to the dialog promoting unit 101 in the pattern (A). Upon receiving this user input, the unit 101 determines whether new topic data should be introduced (Step S203). User input USR7-3 (Japanese cuisine) is a response to SYS7-3. The unit 101 determines that the user has not changed the topic (No in Step S203). The dialog promoting unit 101 then substitutes "Japanese cuisine" for the argument "genre" and keeps performing Step S201. Since the argument has been so substituted, the input-interpretation rule changes to "restaurant retrieval (retrieval genre: Japanese cuisine)". Hence, the unit 101 determines that the problem concerning with the topic "restaurant retrieval" has been solved. The dialog promoting unit 101 then activates the application that corresponds to the topic "restaurant retrieval", retrieving Japanese restaurants. The unit 101 informs the user of the Japanese restaurants thus retrieved, i.e., "Japanese restaurant X" (SYS7-4).

Upon solving the problem concerning the present topic, the dialog promoting unit 101 determines that new topic data should be introduced (Yes in Step S203). In this case, a data-collecting condition is set so that topics whose arguments are facilitate-type data may be used as topics that can use the facilitate-type data "restaurant X, Japanese cuisine" (Step S601). The topics collected, to which the dialog may be switched, are therefore a normal-topic group (={"destination setting"}) and an unusable-topic group (={"facilitate reservation"}) (Steps S602 and S603).

The use-disapproval-notice-output determining unit 102 determines that a use-disapproval notice should not be output to inform that "no facilitates can be reserved" (Step S205, and Yes in Step S206). This is because the unusable-topic group, which has been obtained by collecting topics to which the dialog may be switched, contains "facilitate reservation". Then, the unit 102 outputs a use-disapproval notice SYS7-5. Thereafter, the dialog promoting unit 101 keeps performing the dialog with the user (Step S201).

In Step S201, the dialog promoting unit 101 performs the following process. Since the normal-topic group, which has been obtained by collecting topics to which the dialog may be switched, includes only one topic "destination setting", the new topic is "destination setting". The unit 101 therefore informs the user that this topic can be used (SYS7-6). Then, the unit 101 keeps performing the dialog with the user in order to solve the problem concerning the topic "destination setting".

As in this example of a dialog, any topic that has become unusable can be detected from those designated by the user and can be notified to the user (SYS7-1) in the present embodiment. Further, before the user is prompted to designate a topic to talk about next in the dialog, any topic that has become unusable can be notified to the user (SYS7-5).

Dialog Example 2

The dialog example shown in FIG. 8 will be explained.

In this dialog, a use-disapproval notice is output in the pattern (A) described above. The dialog is then terminated.

First, the dialog starts when USR8-1 is input (Step S201). The user input in the initial step is determined to be the introduction of a new topic (Yes in Step S203). A data-collecting condition is set so that topics for which USR8-1 can be applied to the input-interpretation rule may be collected (Step S601). Topics to which the dialog may be switched are thereby collected (Steps S603 and S603). As a result, a normal-topic group (={ }) and an unusable-topic group (={"local restaurant retrieval"}) are obtained.

The use-disapproval-notice-output determining unit 102 determines that a use-disapproval notice should be output to inform that "local restaurant retrieval cannot be used", because the unusable-topic group includes "local restaurant retrieval" (Step S205, and Yes in Step S206). Then, in Step S207, the dialog promoting unit 101 outputs a use-disapproval notice SYS8-1. Then, the dialog promoting unit 101 keeps performing the dialog with the user (Step S201).

After Step S201, the dialog promoting unit 101 determines in Step S202 whether the dialog with the user should be terminated. The normal-topic group, which has been obtained in the step of collecting topics to which the dialog may be switched, is empty, and no preset topic data is available. Therefore, the unit 101 determines that the dialog can no longer be continued and terminates the dialog (Yes in Step S202).

Thus, it is possible to inform the user that the topic he or she has designated is no longer used, as in this dialog example (SYS8-1).

Dialog Example 3

Figures 9, 10:
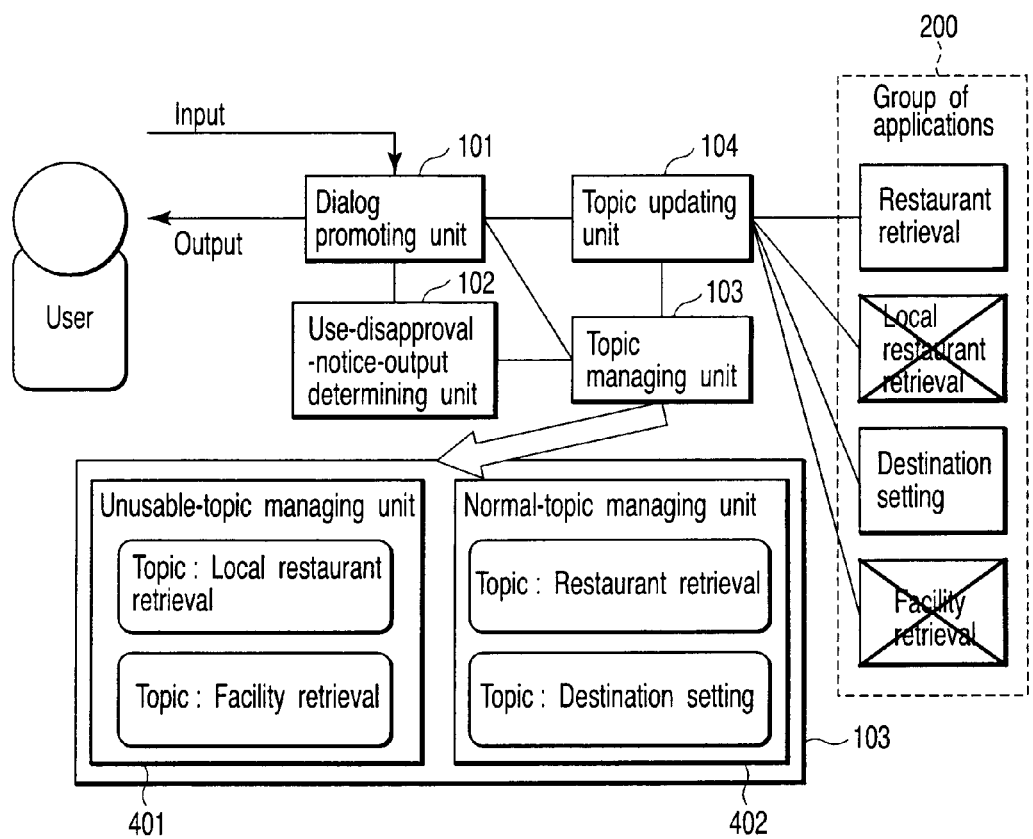
FIG. 9 is a diagram showing still another example of a dialog performed in the first embodiment.
FIG. 10 is a diagram showing a state in which the dialog apparatus operates to perform a dialog according to the first embodiment.

The dialog example shown in FIG. 9 will be described.

In this dialog, a use-disapproval notice is output in the pattern (B) described above.

First, the dialog starts when USR9-1 is input (Step S201). The user input made in the initial step is determined to be the introduction of a new topic (Yes in Step S203). A data-collecting condition is set so that topics for which USR9-1 can be applied to the input-interpretation rule may be collected (Step S601). Topics to which the dialog may be switched are thereby collected (Steps S603 and S603). As a result, a normal-topic group (={destination setting}) and an unusable-topic group (={ }) are obtained.

The use-disapproval-notice-output determining unit 102 determines that a use-disapproval notice should not be output, because the unusable-topic group is empty (Step S205, and No in Step S206). Then, the dialog promoting unit 101 performs its function again (Step S201). Since the normal-topic group, which has been obtained by collecting topics to which the dialog may be switched, includes only one topic "destination setting", the new topic is "destination setting". The unit 101 therefore informs the user that this topic can be used (SYS9-1). Then, the unit 101 sets the topic data input in the initial step, i.e., "destination setting (destination: φ)" is set in the present topic data, and determines that the argument "destination" not available yet should be acquired.

If the value of the argument "destination" should be acquired, the dialog promoting unit 101 determines that new topic data should be introduced in the pattern (B) (Yes in Step S203). In this case, the type of the data to acquire is "facility". Therefore, a data-collecting condition is set for collecting topics of the output-data type "facility" (Step S601). As a result, a normal-topic group (={"restaurant retrieval"}) and an unusable-topic group (={"local restaurant retrieval"}) are obtained (Steps S602 and S603).

Since the unusable-topic group, which has been obtained by collecting topics to which the dialog may be switched, includes "local restaurant retrieval", the use-disapproval-notice-output determining unit 102 determines that a use-disapproval notice should be output to inform the user that "local restaurant retrieval cannot be used" (Step S205, Yes in Step S206). In Step S207, the dialog promoting unit 101 outputs a use-disapproval notice SYS9-2. Then, the dialog promoting unit 101 keeps performing the dialog with the user (Step S201).

In Step S201, the dialog promoting unit 101 performs the following process. Since the normal-topic group, which has been obtained by collecting topics to which the dialog may be switched, includes only one topic "restaurant retrieval", the new topic is "restaurant retrieval". The unit 101 therefore informs the user that this topic can be used (SYS9-3). Since the argument "destination" of the topic "destination setting" is being acquired in the dialog, the new topic data is determined to represent a topic for acquiring the argument "destination". Hence, the present topic data is set to "destination setting (destination: restaurant retrieval (retrieval genre: φ))". The argument to acquire next is therefore "retrieval genre", which remains unsolved in the sub-topic contained in the topic. Thereafter, the dialog continues to solve the problem concerning the topic "restaurant retrieval".

Thus, in the present embodiment, any topic that has become unusable in this state can be shown to the user, as in this dialog example, before the unit 101 prompts the user to proceed with the dialog (SYS9-2).

In the present embodiment, even if an application is deleted, the topics related to the application are not deleted. Rather, they are stored, as topics that have become unusable, in the unusable-topic managing unit 401. When a user input is made or as the dialog goes on, the topics, including unusable ones, are retrieved. Then, a use-disapproval notice is output for the unusable topics. Thus, a use-disapproval notice can be output, exclusively for the topics in accordance with the proceeding of the dialog.

The topics that accord with the proceeding of the dialog are interesting to the user. The use-disapproval notice exclusively for these topics can be more reliably noted by the user than the any notice for topics that are not related to the dialog proceeding now. On the other hand, the use-disapproval notices for the topics not related to the dialog, must all be output at the start of the dialog or at any timing during the dialog. These use-disapproval notices may be, for example, "you cannot use the local restaurant retrieval or the facility reservation". The larger the number of topics that cannot be used, the greater the amount of information used in use-disapproval notices. Consequently, the information necessary to the user may be concealed amid the use-disapproval notices. The user can hardly recognize that the interesting topics can no longer be used in the dialog.

Thus, in the present embodiment, not only the topics that can be used in the dialog, but also the topics that cannot be used are stored. Hence, both the usable topics and the unusable topics are retrieved to find any topic that can be used in the dialog now proceeding. If the topics retrieved include any unusable topic, a use-disapproval notice will be output. The topics that have become unusable when any application is deleted can therefore be notified to the user.

To enable the dialog apparatus 100 to receive the user's oral inputs, a speech-recognition engine must be used to accomplish speech recognition when the dialog promoting unit 101 interprets the user input. To achieve speech recognition, a speech-recognition grammar must be designated for the speech-recognition engine. In this embodiment, unusable topics may be input in the pattern (A). Nonetheless, oral inputs related to the unusable topics will be erroneously recognized unless the speech-recognition grammar can cope with the unusable topics. In view of this, this embodiment must use a speech-recognition grammar that enables the apparatus 100 to recognize the user's oral inputs about unusable topics.

Figure 26:
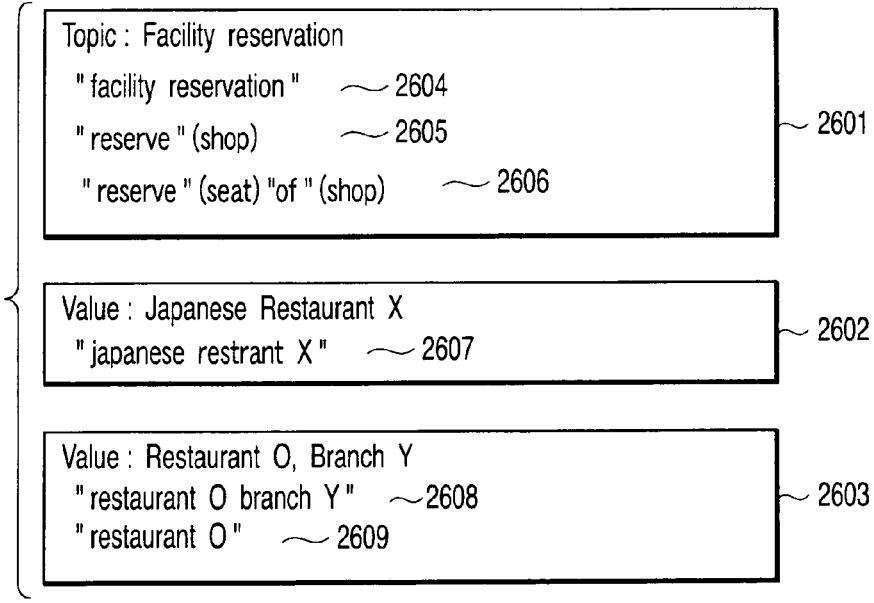
FIG. 26 is a diagram showing a description example of speech-recognition grammar.

FIG. 26 shows, in detail, a description example of speech-recognition grammar, which can be used in the present embodiment. A topic grammar 2601 is a list of input patterns that can represent topics. More precisely, the topic grammar 2601 consists of three input patterns (2604, 2605 and 2606). In each input pattern, a value corresponding to the argument of a topic can be described in "( )". In "(shop)", for example, a speech-recognition grammar (2602 or 2603) can be described for a facility-type value that can be substituted for argument "(shop)" of topic "facility reservation". In each space a notation composed of characters only can be described, as is "facility reservation". That is, a notation of "facility reservation" is described. The grammar for "reserve (shop)", for example, enables the apparatus 100 to accept a speech such as "Reserve Japanese restaurant X", and to output a list of recognized speeches (in characters and letters). The speech-recognition grammars 2602 and 2603) for facility-type values are speech-recognition grammars, each applied to a facility-type value. A plurality of expressions may be allocated to one value (as in the grammar 2603). The individual notations of either grammar 2602 or 2603 are identical to the elements of the topic grammar 2601.

Figure 25:
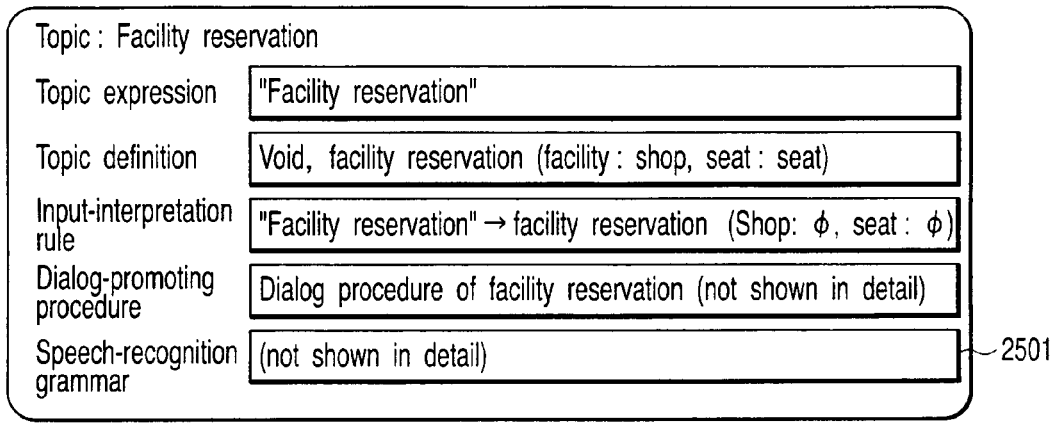
FIG. 25 is a diagram showing, in detail, an example of a topic that is configured in consideration of speech inputs used in the first embodiment.

In the present embodiment, the speech-recognition grammar is managed, associating the grammar items with the topics as is illustrated in FIG. 25 (2501). The topic grammar 2601 shown in FIG. 26 is a speech-recognition grammar that expresses the topic "facility reservation". This grammar is contained in the grammar 2501. The grammars 2602 and 2603 for facility-type values may be contained, as part of the topic grammar, in the grammar 2501. Nonetheless, they may be stored in a database if they can be used in common for a plurality of topics.

During the dialog with the user, the dialog promoting unit 101 designates a speech-recognition grammar for the speech-recognition engine. The speech-recognition grammar so designated will be called "overall speech-recognition grammar" so that it may be distinguished from the topic grammar. The speech-recognition grammar may be designated at various timings. It can be designated when the dialog is started. Alternatively, it can be designated while the unit 101 is waiting for a user input after it has output a response to the user. In the present embodiment, the overall speech-recognition grammar is a combination of grammars for all topics, i.e., normal ones and unusable ones. Thus, the overall speech-recognition grammar is updated as the contents of the topic managing unit 103 are changed. A speech-recognition grammar can therefore be set, even for topics that have become unusable.

To utilize the speech recognition, the present embodiment may be configured as shown in FIG. 27. This configuration is designed not to manage speech-recognition grammars for the respective topics. Rather, it is designed to store a speech-recognition grammar for all topics, including normal ones and unusable ones, in a speech-recognition-grammar managing unit 2705. The contents of the speech-recognition-grammar managing unit 2705 are updated whenever the contents of the topic managing unit 103 are updated.

As described above, the speech-recognition grammars are managed in association with the topics in the present embodiment. Any speech-recognition grammar can therefore be applied even if applications are deleted. The dialog promoting unit 101 can therefore accept oral inputs about any unusable topic and output a use-disapproval notice related to the topic.

(Modification)

Figure 11:
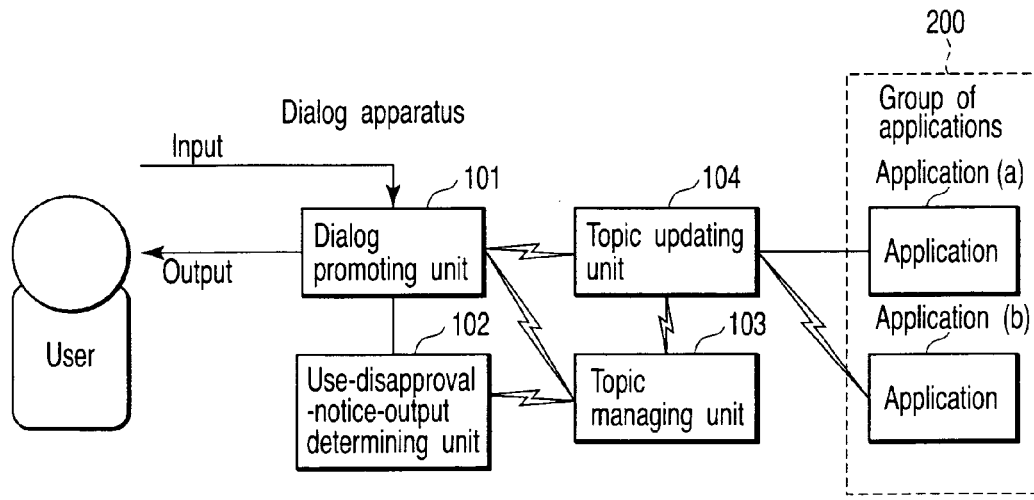
FIG. 11 is a diagram showing another configuration the first embodiment may have.

The topic managing unit 103 and topic updating unit 104 have been described as incorporated in the dialog apparatus 100. The present embodiment is not limited to this configuration, nevertheless. For example, topic managing unit 103 and topic updating unit 104 may be provided outside the dialog apparatus 100 as is illustrated in FIG. 11. In this case, topics can be accessed via networks. Note that in FIG. 11, the components identical to those shown in FIG. 1 are designated by the same reference numbers.

Figure 12:
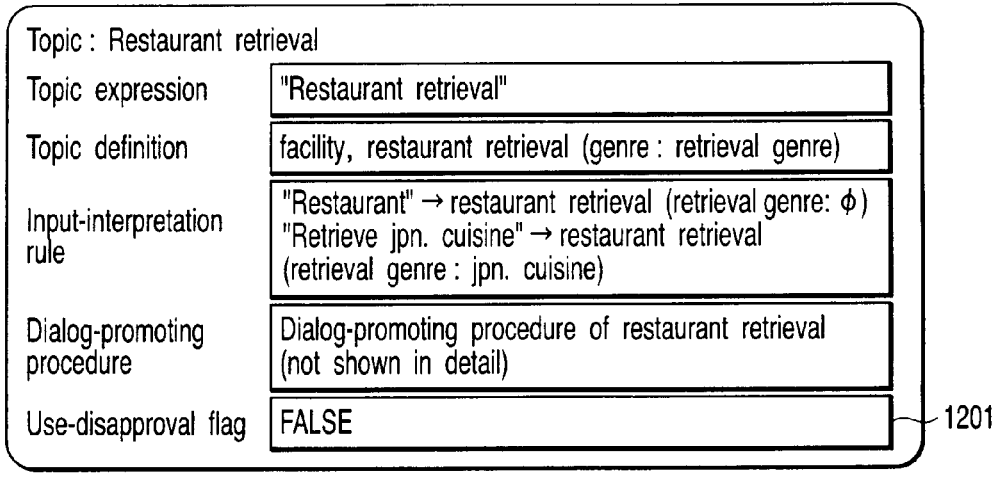
FIG. 12 is a diagram explaining another topic for the dialog performed in the first embodiment.
Figure 13:
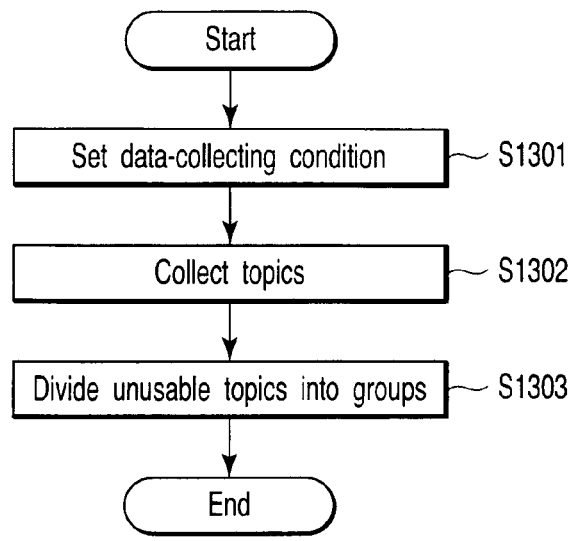
FIG. 13 is a flowchart explaining in detail how the first embodiment operates.

The topic managing unit 103 has been described as composed of two databases, i.e., unusable-topic managing unit 401 and normal-topic managing unit 402. The present embodiment is not limited to this configuration, nevertheless. For example, the topic managing unit 103 may manage both usable topics and unusable topics. If this is the case, a "use-disapproval flag" (1201) is attached to each topic, as is shown in FIG. 12. When an application is deleted, the topic updating unit 104 inverts the use-disapproval flag related to the application, to "TRUE" (unusable) and then performs the procedure of Step S204 (FIG. 2) as shown in FIG. 13. That is, in Step S1302, the topics that accord with the data-collecting condition are collected, irrespective of the use-disapproval flag, and are classified into a normal-topic group and an unusable-topic group. Then, the use-disapproval notice can be discriminated, without altering the function of the use-disapproval-notice-output determining unit 102. Such a configuration falls within the scope of the embodiment, so long as normal topics can be distinguished from unusable ones.

As described above, the topic updating unit 104 registers any topics that have become unusable, in the normal-topic managing unit 402. Instead, only these topics may be registered in the unusable-topic managing unit 401. Then, only the use-disapproval notice can be output, whereas, in the above-described case, the usable topics, too, can be collected and shown to the user.

This configuration falls within the scope of the embodiment, so long as it can collect usable topics and use them in order to output a use-disapproval notice.

As described above, each topic includes a topic expression, a topic definition, an input-interpretation rule, and a dialog-promoting procedure, as is illustrated in FIG. 5. Nonetheless, the present embodiment is not limited to this. For example, the dialog promoting unit 101 may operate in accordance with a scenario of a state-transition type. In this case, the topic definition may not be necessary. Further, the input-interpretation rule need not be assigned to each topic if a rule has been formulated to work on all possible topics. The dialog-promoting procedure, managed for each topic, may not be necessary, either, if the dialog is dynamically generated. Moreover, any dialog-promoting rule for each topic is unnecessary if the dialog-promoting procedure has been formulated to work on all possible topics.

Like the composition of the topic data, the method of setting the data-collecting condition is not limited to the method described above. The data-collecting condition can be set in three patterns; (A), (B) and (C). Any condition, in which topics that may be used can be collected, falls within the scope of the embodiment.

If the condition is set as in the case (A), that is, when the user inputs any topic different from the present topic, the topic the user may designate may be used in the dialog. In view of this, an input-interpreting process may be performed, and all topics output in this input-interpreting process may be collected. This method can be implemented with reference to a consolidated input-interpretation rule applicable to all topics, not with reference to each input-interpretation rule applicable to one topic only.

If the condition is set as in the case (B), that is, when the user decides to use another topic as a sub-goal in order to solve the problem concerning the present topic, the topic the user may designate is one that acquires a value that fulfills the sub-goal. In view of this, the topic for acquiring the argument may be described in the dialog-promoting procedure and the data may then be collected from the dialog-promoting procedure. This method can be implemented, with reference to the dialog-promoting procedure only, without the necessity of referring to the topic definition.

If the condition is set as in the case (C), that is, when a topic is selected after the problem concerting the present topic has been solved, the topic the user may designate is one that naturally follows the topic with which the problem has been solved and that may therefore be used. In view of this, the topic that naturally follows may be described in the dialog-promoting procedure, at the ending scene of the dialog. This method can be implemented, with reference to the dialog-promoting procedure only, without the necessity of referring to the topic definition.

In the data-collecting patterns (A), (B) and (C), data items are collected in accordance with the types of data. Nonetheless, if data types are hierarchal, any data items that are not identical in type but equivalent in hierarchy may be collected together.

Thus, any technique that employs a method of setting the condition of collecting the detailed data about the topics that can be used as new topic falls within the scope of the embodiment. The topic expressions are described as text data to be designated. Instead, they may be any other types of data only if they clearly show which topics they correspond to. They may be, for example, icons in the case where the use-disapproval notice is output to the user, by displaying the notice on the screen. Such an icon may be combined with mark "x" or with text data.

To determine in Step S203 whether it is necessary to introduce new topic data, the timing of deciding that another topic should be used as a sub-goal to solve the problem with the present topic as in the case (B) is not limited to the example described above. In the above-mentioned example, the decision made in Step S203 is affirmative (Yes) if the dialog promoting unit 101 determines that the value of a specific attribute should be acquired. Then, the operation goes to the process (Step S204 et seq.) of collecting topics to which the dialog may be switched. Nevertheless, the decision made in Step S203 may be affirmative (Yes), if the dialog promoting unit 101 determines that the value of a specific attribute should be acquired and outputs a request, such as "Input the destination", and if the user requests for help and if time-out for inputs occurs, making it necessary to present a more detailed procedure.

In Step S203 of determining whether new topic data should be introduced, the decision is Yes if it is determined that the sub-goal should be attained in the case (B) or (C) or if the problem with the present topic is solved. Nonetheless, the decision may be No if it is clear that new topics have not been collected. In the example described above, for example, it may be attempted to collect topics to acquire the value of a genre-type argument. Then, a message "Designate the genre" is then output if no topics are collected at all. Instead, when it is determined that the topic managing unit 103 stores no topic definition for output data of genre type, it is decided that no new topics are necessary (No in Step S203). If this is the case, the message "Designate the genre" is output.

The method of detecting the timing of switching the topic to a new one as described above may be employed. Any configuration employing this method falls within the scope of the embodiment.

The use-disapproval message is not limited to "You cannot use the application". Instead, it may be "the application has been deleted". Once informed of the deletion of the application, the user will not try to access the application again.

In the example described above, the topic updating unit 104 can add or delete application units. Instead, the unit 104 may add and delete function units associated with topics. In this case, the topic updating unit 104 performs such an updating process as rendering unusable the topics associated with the functions.

Any embodiment falls within the scope of the embodiment if it can, as describe above, store unusable topics, as well as usable topics, collect topics that may be used in the dialog with the user, from both the group of usable topics and the group of unusable topics, and output a use-disapproval notice if any unusable topic is found in the topics collected.

Second Embodiment

In the first embodiment, a use-disapproval notice is output in respect of the unusable topics. According to the embodiment, a use-disapproval notice can be output as in the first embodiment, not with respect to unusable topics, but with respect to value (item) units. The present embodiment is designed to provide a dialog apparatus 100 that outputs a use-disapproval notice with respect to value units.

The use-disapproval notice with respect to value units informs the user that "Restaurant A is unusable data" when the user is about to retrieve, for example, restaurants, if the restaurant has moved. The message to the user may be "You can no longer use Restaurant A".

Figure 14:
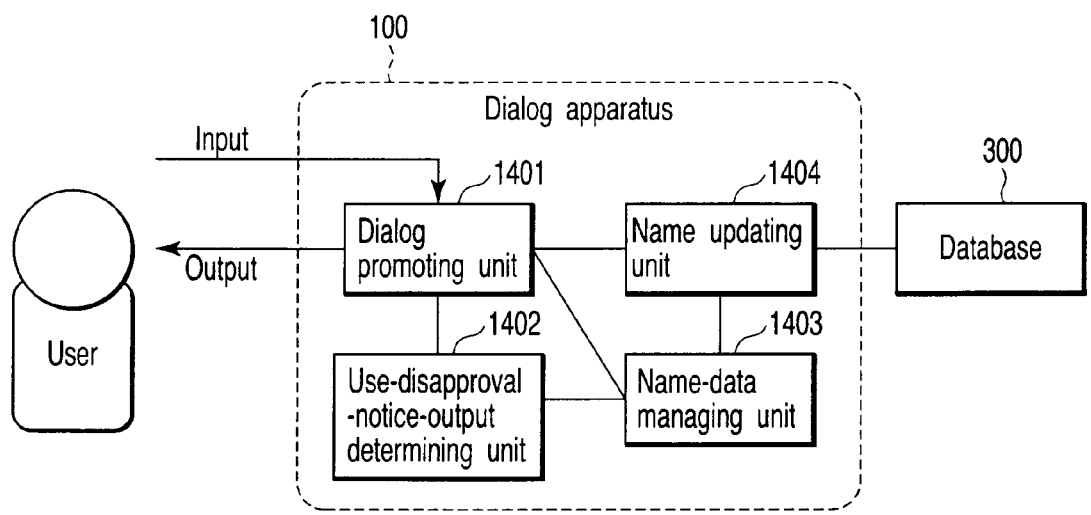
FIG. 14 is a diagram showing the configuration of a second embodiment.

FIG. 14 shows the configuration of the dialog apparatus 100 according to this embodiment. The dialog apparatus 100 has a dialog promoting unit 1401, a use-disapproval-notice-output determining unit 1402, a name-data managing unit 1403, and a name updating unit 1404. The present embodiment differs from the first embodiment in that the dialog promoting unit 1401 performs operations that differ from those the dialog promoting unit 101 performs and that the name-data managing unit 1403 and name updating unit 1404 are used in place of the topic managing unit 103 and topic updating unit 104. This difference results from the fact that units of data, which are managed to output use-disapproval notices, have been changed from topics to values.

The second embodiment will be described below.

The dialog promoting unit 1401 performs operations that are essentially identical to the operations the dialog promoting unit 101 performs in the first embodiment. The unit 1401 need not change topics. It need not perform any process the dialog promoting unit 101 performs to introduce new topics in the first embodiment.

In the present embodiment, the dialog promoting unit 1401 differs from the dialog promoting unit 101 in that it collects a group of name-data items from the name-data managing unit 1403 (D) when a user input notifies the values of the name-data items or (E) when it is determined that the user should be prompted to input data of a specific type. The name data will be described later in detail.

In this embodiment, the name-data managing unit 1403 manages name-data items that can be used at present and name-data items that have become unusable (unusable name-data items). Each name-data item consists of a value that is registered in a database 300 and a data item that is referred to so that the value may be used in a dialog. That is, the name-data item is a data configuration that includes the expression of its value. The name-data managing unit 1403 and the name-data item will be described later in detail.

The name updating unit 1404 manages the contents of the database 300, which can be accessed from the dialog apparatus 100. When the contents of the database 300 are updated, the unit 1404 updates the contents of the name-data managing unit 1403. For example, when usable values are added to the database 300, the unit 1404 adds the name-data items related to these values to the name-data managing unit 1403. When usable values are deleted from the database 300, the unit 1404 changes the name-data items related to these values to unusable name-data items. This operation is analogous to the operation that the topic updating unit 104 performs in the first embodiment to update the topics.

Figure 17:
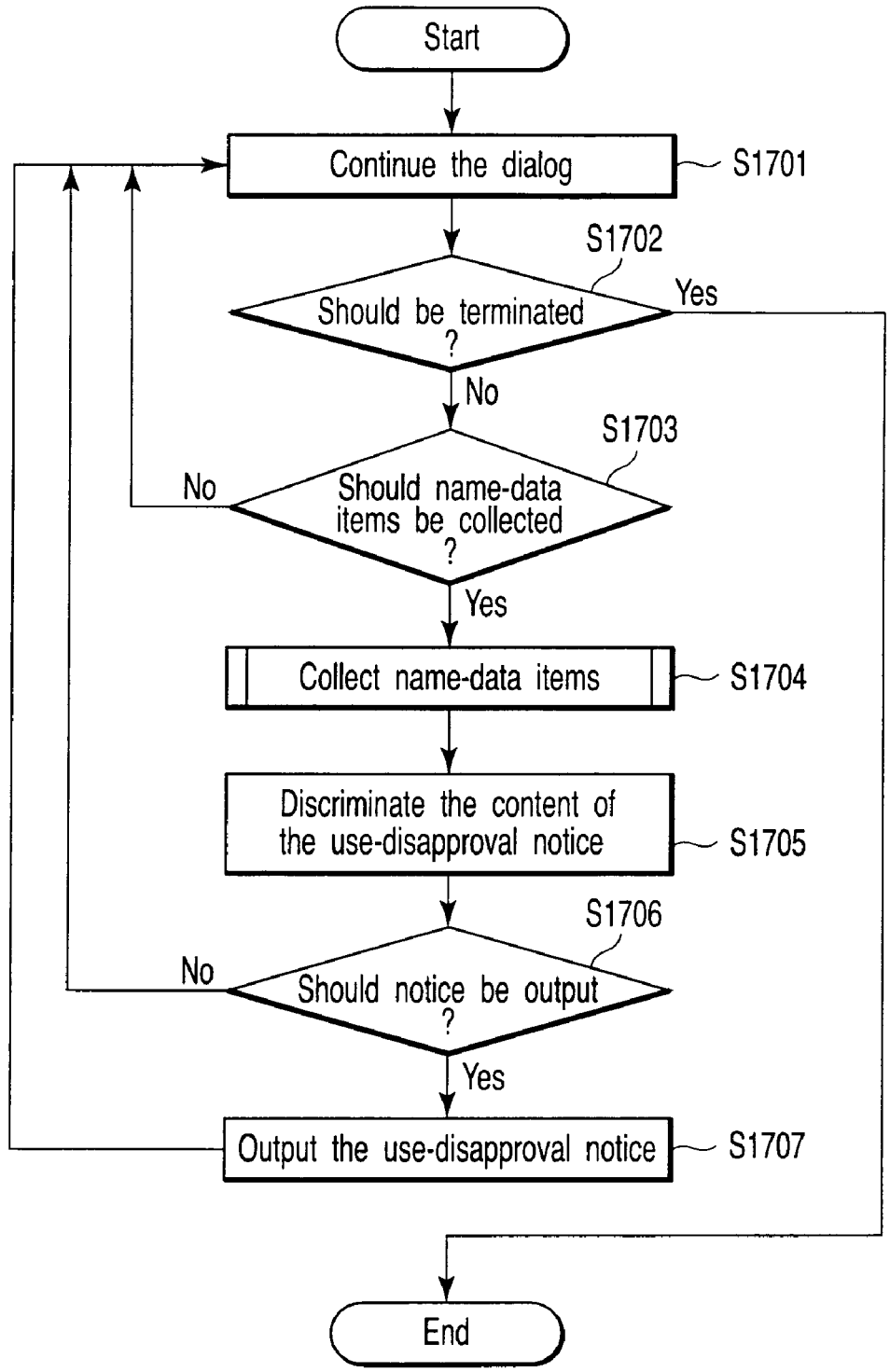
FIG. 17 is a flowchart explaining how the second embodiment operates.

How the dialog apparatus 100 according to the present embodiment operates will be explained with reference to FIG. 17. FIG. 17 is a flowchart explaining how the dialog apparatus 100 operates.

The dialog apparatus performs a dialog with the user. "Start" shown in FIG. 17 is the step in which the user or the dialog apparatus 100 starts the dialog. The dialog is terminated at the step "End" shown in FIG. 17. The step of continuing the dialog with the user (Step S1701) and the step of determining the end of dialog (Step S1702) are similar to Step S201 and Step S202 performed in the first embodiment, respectively.

In Step S1703 it may be determined that name-data items should be collected. Then, the dialog promoting unit 1401 collects the name-data items that accord with a particular condition, from the name-data managing unit 1403 (Step S1704).

The step of determining whether name-data items should be collected (i.e., Step S1703) will be explained. The dialog promoting unit 1401 must collect name-data items in the above-mentioned two cases (D) and (E). In either case, the dialog promoting unit 1401 determines that name-data items should be collected and then selects a method of collecting the name-data items.

In Step S1705, the content of a use-disapproval notice is discriminated from the result of the name-data collection, performed in Step S1704. Step S1704 and Step S1705 will be described later in detail.

The step of determining whether a use-disapproval notice should be output (Step S1706) and the step of outputting the use-disapproval notice (Step S1707) are similar to Step S206 and Step S207 that are performed in the first embodiment. If it is determined that a use-disapproval notice should not be output (that is, if No in Step S1706), the dialog promoting unit 1401 keeps performing the dialog with the user.

Figure 15:
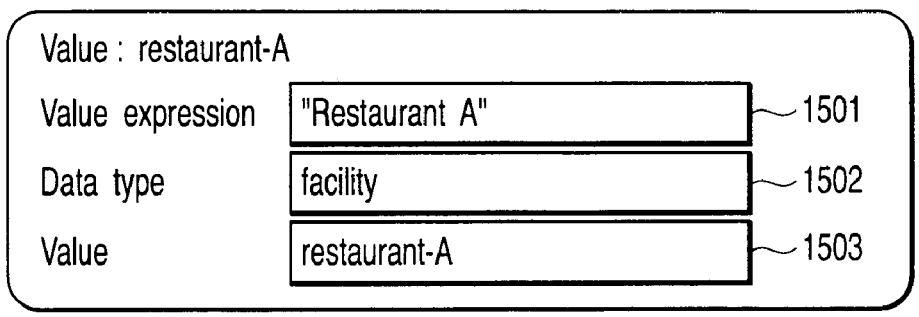
FIG. 15 is a diagram showing an example of name data used in the second embodiment.

The name-data item will be described in detail. FIG. 15 is a diagram showing an example of a name-data item. The name-data item consists of a value (1503), a value expression (1501), and a data type (1502). The value 1503 is registered in the database 300. The value expression 1501 identifies the value 1503. The data type 1502 represents the type of the value 1503. The value expression 1501 is used to output a use-disapproval notice in connection with the value 1503.

Figure 16:
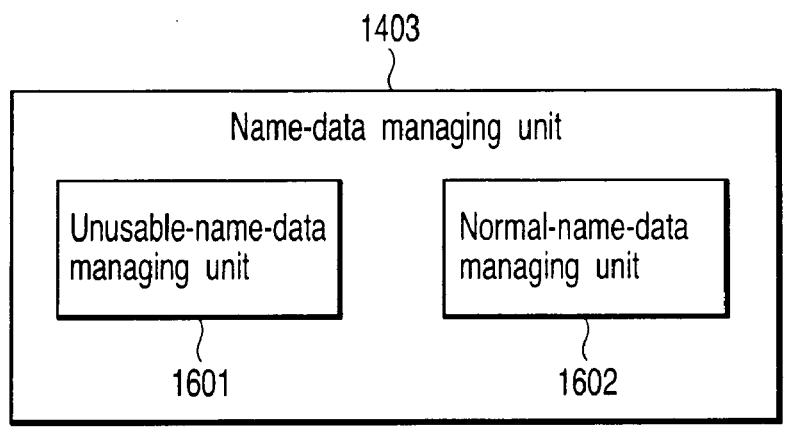
FIG. 16 is a diagram showing the configuration of the name data managing unit used in the second embodiment.

FIG. 16 shows the configuration of the name-data managing unit 1403 used in the present embodiment. Like the topic managing unit 103 used in the first embodiment, the name-data managing unit 1403 comprises two types of databases, i.e., an unusable-name-data managing unit 1601 and a normal-name-data managing unit 1602. The unusable-name-data managing unit 1601 is a database that manages the name-data items that have been deleted. The normal-name-data managing unit 1602 is a database that manages the name-data items that can be accessed from the dialog apparatus.

The name updating unit 1404 operates in a similar way as the topic updating unit 104 does in the first embodiment. That is, the unit 1404 updates the name-data managing unit 1403 as the usable values change. Upon detecting that values have been added for use in the dialog, the name updating unit 1404 adds the names related to these values, to the normal-name-data managing unit 1602. When usable values are deleted, the unit 1404 transfers the name-data items related to these values, from the normal-name-data managing unit 1602 to the unusable-name-data managing unit 1601.

Figure 18:
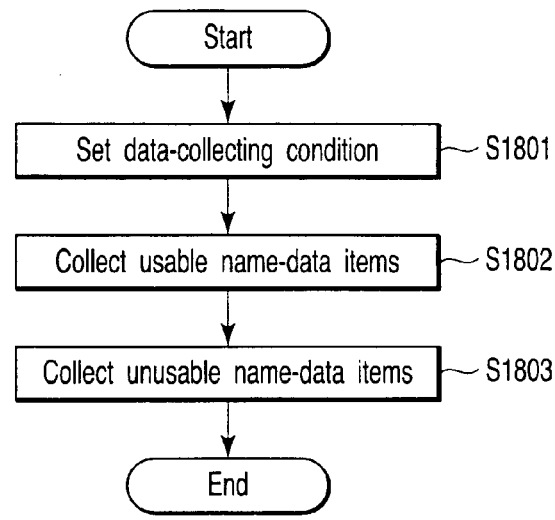
FIG. 18 is a flowchart explaining in detail how the second embodiment operates.

How the dialog promoting unit 1401 operates in Step S1704 will be explained in detail, with reference to FIG. 18. FIG. 18 is a flowchart explaining Step S1704 in detail.

Step S1704 is a process of collecting name-data items, which is performed when the dialog promoting unit 1401 needs to collect these data items. First, the dialog promoting unit 1401 sets a condition of collecting name-data items (Step S1801). The method of setting this condition depends on the pattern in which name-data items should be collected. Step S1802 and Step S1803 are similar to Steps S602 and Step S603 performed in the first embodiment, except that the data items collected are name-data items, not topics. The name-data items collected consists of a "normal name-data group" and an "unusable name-data group". The combination of these groups of data items is output as the result of the data collecting process.

Step S1801 will be explained in detail. In Step S1703, the dialog promoting unit 1401 determines whether name-data items should be collected. If it is determined that name-data items should be collected, Step S1801 is performed. Step S1801 must be performed (D) when a user input notifies the values of the name-data items or (E) when it is determined that the user should be prompted to input data of a specific type. Hence, in Step S1801, one of two alternative conditions is set to collect name-data items, in accordance with the pattern (D) or the pattern (E). A method of setting the condition of collecting name-data items will be explained below.

The pattern (D) is recognized when a user input is made. If the user input notifies any values, it will be determined that name-data items should be collected to confirm whether these values can be used. In this pattern, it suffices to collect the name-data items that correspond to the values the user input has notified. Therefore, in Step S1801, the data-collecting condition is to collect the name-data items whose values notified by the user input are identical to the values registered in the name-data items.

The pattern (E) is recognized while the dialog promoting unit 1401 is discriminating the contents of the system response. When the dialog promoting unit 1401 determines the argument for prompting the user to input data in order to solve the problem concerning the present topic, it is determined that name-data items should be collected to confirm whether the argument includes values that cannot be used. In this pattern, it suffices to collect the values corresponding to the data type of the argument that prompts the user to input data. Therefore, in Step S1801, the data-collecting condition is to collect the name-data items whose data type notified by the argument prompting the user to input data are identical to the data type registered in the name-data items.

Step S1705, in which the use-disapproval-notice-output determining unit 1402 performs its function, will be explained. In this step, the unit 1402 determines that a use-disapproval notice should be output in connection with the name-data items (values) of the unusable name-data group unless the unusable name-data group is empty, as in Step S205 performed in the first embodiment.

With reference to FIGS. 17 to 21, it will be explained in detail how the present embodiment operates if it is applied to a dialog system that utilizes a facility retrieval service. This system can handle only a topic expressed by a topic definition "detailed data facility-data retrieval (facility: object facility)". Upon receiving the facility name from the user, the system provides information about the facility identified by the facility name. "Restaurant-A" and "restaurant-B" are registered, as facility data items, in the database of the system.

Figure 19:
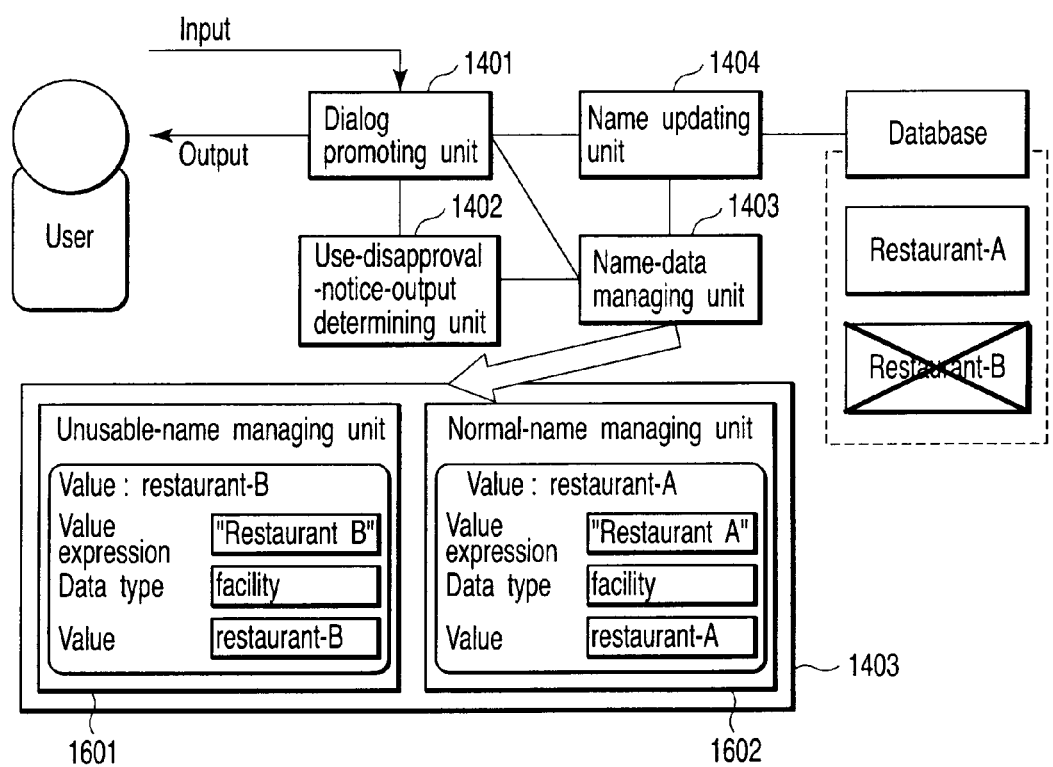
FIG. 19 is a diagram showing state in which the dialog apparatus operates to perform a dialog according to the second embodiment.

The following description is based on the assumption that "restaurant-B" cannot be used (FIG. 19). Hence, the normal-name-data managing unit 1602 and the unusable-name-data managing unit 1601 store "restaurant-A" and "restaurant-A", respectively.

Dialog Example 4

The dialog example shown in FIG. 20 will be explained.

In this case, the use-disapproval notice is output in the pattern (E). First, a dialog is started when USR20-1 is input (Step S1701). This user input is interpreted as topic data "facility-data retrieval (object facility: $\phi$)". At the initial stage, the dialog is never determined to have been terminated (No in Step S1702). Since this interpretation is not a value, the dialog promoting unit 1401 determines that no named-data items will be collected (No in Step S1703). The dialog promoting unit 1401 registers this interpretation as present topic data and keeps performing the dialog with the user. The unit 1401 then determines that the argument "object facility" should be acquired from the user. Since this decision corresponds to the pattern (E) of collecting name-data items, the dialog promoting unit 1401 collects name-data items (Yes in Step S1703).

In Step S1801, it is determined that data should be collected in the pattern (E). Since the argument of the object to acquire is "facility", the dialog promoting unit 1401 determines that name-data items of data type "facility" should be collected from the name-data managing unit 1403. The dialog promoting unit 1401 collects the name-data items of the object from the normal-name-data managing unit 1602, acquiring the normal name-data group (={"restaurant-A"}) (Step S1802). Then, the dialog promoting unit 1401 collects name-data items from the unusable-name-data managing unit 1601, in a similar manner, thus acquiring the unusable name-data group (={"restaurant-B"}) (Step S1803).

Since the unusable name-data group includes "restaurant-B", the use-disapproval-notice-output determining unit 1402 determines that a use-disapproval notice should be output to inform that "restaurant-B" cannot be used (Step S1705, Yes in Step S1706). A use-disapproval notice SYS20-1 is therefore output. Thereafter, the dialog promoting unit 1401 keeps performing the dialog with the user (Step S1701).

In Step S1701, the dialog promoting unit 1401 performs the following process. Since it has been determined that data about the argument "object facility" should be acquired and the name-data items have been already collected, the unit 1401 outputs a response (SYS20-2), prompting the user to input "object facility". Then, the unit 1401 keeps performing the dialog with the user.

In the present embodiment, the unit 1401 can notify to the user of the value that has become unusable in connection with a specific data, as in this dialog example, before it prompts the user to input this data.

Dialog Example 5

The dialog example shown in FIG. 21 will be explained.

In this case, the use-disapproval notice is output in pattern (D).

First, a dialog is started when USR21-1 is input (Step S1701). This user input is interpreted as value "restaurant-B". At the initial stage, the dialog is never determined to have been terminated (No in Step S1702). Since this interpretation is a value, the dialog promoting unit 1401 determines that named-data items will be collected (Yes in Step S1703).

The dialog promoting unit 1401 determines that the name data of the value "restaurant-B" should be collected (Step S1801). Then, the name-data items are collected from the normal-name-data managing unit 1602 and the unusable-name-data managing unit 1601 (Step S1802 and Step S1803). As a result, the normal name-data group and the unusable name-data group become { } and {"restaurant-B"}, respectively.

Since the unusable name-data group includes "restaurant-B", the use-disapproval-notice-output determining unit 1402 determines that a use-disapproval notice should be output to inform that "restaurant-B" can be used (Step S1704, Yes in Step S1706). Then, in Step S1707, the dialog promoting unit 1401 outputs a use-disapproval notice SYS21-1. Thereafter, the unit 1401 tries to keep performing the dialog with the user (Step S1701). However, the unit 1401 stops the dialog with the user because the present topic data is not set (Yes in Step S1702).

Thus, in the present embodiment, it can be determined whether the value input by the user can be used. If the value cannot be used, this fact can be notified to the user. In this dialog example, the user notifies a value at the initial stage. Nonetheless, since the pattern (D) does not include the state of the dialog, it is determined whether a user input, e.g., an answer to a question made by the dialog apparatus 100, can be output, and a use-disapproval notice can then be output.

In the present embodiment, even if a value is deleted from the database, the name data related to the value is not deleted as in this dialog example. The value is stored in the unusable-name-data managing unit 1601 as the name data for the value that has become unusable. When a user input is made or the dialog proceeds, the named data is searched for, along with the unusable name data. If the unusable name data is found, too, a use-disapproval notice is output in connection with this unusable name data. Hence, use-disapproval notices can be output, exclusively for values that accord with the dialog that is proceeding.

Values that accord with the dialog are data items of interest to the user. The use-disapproval notice exclusively for these values can be more reliably noted by the user than the any notice for values that are not related to the dialog proceeding now. On the other hand, all use-disapproval notices containing values not related to the dialog must be output at the start of the dialog or at any timing during dialog. These use-disapproval notices may be, for example, "You cannot use restaurant-B". The larger the number of values that cannot be used, the greater the amount of information used in use-disapproval notices. Consequently, the information necessary for the user may be concealed amid the use-disapproval notices. Inevitably, the user can hardly recognize that the interesting values can no longer be used in the dialog.

Thus, in the present embodiment, not only the values that can be used in the dialog, but also the values that cannot be used are stored. Hence, both the usable values and the unusable values are retrieved to find any value that can be used in the dialog now proceeding. If the values retrieved include any unusable one, a use-disapproval notice will be output. The values that have become unusable once they have been deleted from the database can therefore be notified to the user as the dialog proceeds.

To enable the dialog apparatus 100 to receive the user's oral inputs, a speech-recognition engine must be used to accomplish speech recognition when the dialog promoting unit 1401 interprets the user input. To achieve speech recognition, a speech-recognition grammar must be designated for the speech-recognition engine. In the present embodiment, unusable values may be input in the pattern (D). Nonetheless, oral inputs related to the unusable values will be erroneously recognized unless the speech-recognition grammar can cope with the unusable name-data items. In view of this, this embodiment must have a speech-recognition grammar that enables the apparatus 100 to recognize the user's oral inputs about unusable topics.

In the present embodiment, the speech-recognition grammar is managed in association with the name data as shown in FIG. 28 (2801). In FIG. 26, "2602" is the speech-recognition grammar for the value that represents "Japanese restaurant X". This grammar is stored at the location 2801. The speech-recognition grammar for the topics that can be used in the dialog system is managed independently of the name data.

The dialog promoting unit 1401 designates an overall speech-recognition grammar for the speech-recognition engine during the dialog with the user. This grammar can be designated at various timings. It may be designated, for example, at the start of the dialog or at the time of waiting for a user input after a response has been output to the user. The overall speech-recognition grammar used in the present embodiment is a combination of grammars for all name-data items, i.e., normal ones and unusable ones. Thus, the overall speech-recognition grammar can be updated as the contents of the name-data managing unit 1403 are changed. A speech-recognition grammar can therefore be set, even for values that have become unusable.

As another model of using the speech-recognition grammar, the grammar may be managed in the speech-recognition-grammar managing unit 2705 only, in the first embodiment as shown in FIG. 27. In this case, the contents of the speech-recognition-grammar managing unit 2705 are updated when the contents of the name-data managing unit 1403 are updated.

As described above, the speech-recognition grammar is managed in association with the name-data items in the present embodiment. Therefore, even if the name-name items have been deleted, the speech-recognition grammar associated with the unusable name-data items can be set. Hence, the dialog promoting unit 1401 can accept oral inputs concerning unusable name-data items (i.e., unusable values) and can output use-disapproval notices concerning the values related to the oral inputs.

(Modification)

The name-data managing unit 1403 and name updating unit 1404 have been described as incorporated in the dialog apparatus 100. The present embodiment is not limited to this configuration, nevertheless. For example, the name-data managing unit 1403 and name updating unit 1404 may be provided outside the dialog apparatus 100 as in the first embodiment shown in FIG. 11. In this case, name-data items can be accessed via networks.

The name-data managing unit 1403 has been described as composed of two databases, i.e., unusable-name-data managing unit 1601 and normal-name-data managing unit 1602. Instead, as in first embodiment, a "use-disapproval flag" may be attached to each name-data item so that the name-data managing unit 1403 may manage all name-data items, whether usable or unusable. The name updating unit 1404 updates the use-disapproval flag attached to any name-data items when the value related to this named-data item is deleted from the database. Before the dialog promoting unit 1401 collects name-data items, these data items are classified into a normal name-data group and an unusable name-data group. Any configuration than can distinguish between normal name data and unusable name data in this manner falls within the scope of the embodiment.

As described above, the name updating unit 1404 registers the name-data items about any values that have become unusable, in the normal-name-data managing unit 1602. This process may not be performed. In this case, the name-data items about these values may be registered in the unusable-name-data managing unit 1601. In the example described above, the name-data items related to usable values are collected, as well, and the usable values can be registered, too. However, if only the usable name-data items are registered, only a use-disapproval notice will be output.

This configuration falls within the scope of the embodiment, so long as it can collect name-data items related to usable values and use them in order to output a use-disapproval notice.

In the example described above, each name-data item includes a value expression, a data type and a value as is illustrated in FIG. 15. Nonetheless, if the value includes the value expression and the data type or the name and the data type can be automatically generated, the name-data item need not include the value expression or the data type. If a database storing all values in association with their respective data types is provided outside the name-data managing unit 1403, the data type of each name-data item can be acquired from the database. In this case, too, the name-data item need not include the data type.

Like the composition of the name data, the method of setting the data-collecting condition is not limited to the method described above. The data-collecting condition can be set in two patterns, (D) and (E). Any condition, in which name-data items that may be used can be collected in either pattern, falls within the scope of the embodiment.

If the condition is set as in the case (D), that is, when the user inputs any value, the value the user has designated is one that can be used in the dialog. Thus, if a user input includes a plurality of values, name-data items related to all values included in the user input may be collected. This holds true of the case where, for example, the user designates a plurality of facilities ("restaurant-A and restaurant-B") or a plurality of attribute conditions (opening hours of restaurant-B (facility) (type of data to provide)). In the former case, the name-data items are about restaurant-A and restaurant-B. In the latter case, the name-data items are about restaurant-B and the opening hours thereof.

If it is determined that the user should be prompted to input data of a specific type as in the pattern (E), the value of the data type is a value that can be used. If a database is available which stores the value in association with the data type, besides the name-data items, the name-data item of the value may be collected from this database. This method of collecting can be said to accord with the usability of the pattern (E). In such a case, the name-data item can be collected without referring to the data type included in the name-data item. If data types are hierarchal, a name-data item of a value that is not identical in data type but equivalent in hierarchy may be collected.

Thus, any technique employing a method of setting the condition of collecting the detailed data about the name-data items that can be used to prompt the user to input data during the dialog when a user input is made falls within the scope of the embodiment.

The value expressions are described as text-data items to be designated. Instead, they may be any other types of data only if they clearly show which values they correspond to. They may be, for example, icons in the case where the use-disapproval notice is output to the user, by displaying the notice on the screen. Such an icon may be combined with mark "x" or with a text-data item.

To determine in Step S1703 whether it is necessary to collect name-data items, the timing of deciding that the user should be prompted to input data of a certain type as in the case (E) is not limited to the example described above. In the above-mentioned example, the decision made in Step S1401 is affirmative if the dialog promoting unit 1401 determines that a specific argument should be acquired. Then, the operation goes to the process (Step S1704 et seq.) of collecting name-data times. Nevertheless, the decision made in Step S1703 may be Yes, if the dialog promoting unit 1401 determines that the value of a specific attribute should be acquired and outputs a request, such as "Input the object facility", and if the user requests for help and if time-out for inputs occurs, making it necessary to present a more detailed procedure.

In Step S1703 of determining whether name-data items should be collected, a user input notifies the values of name-data items in the case (D) as described above. Nonetheless, this embodiment is not limited to this. In the example described above, the user input is interpreted as topic data and the pattern (D) is not used. However, if the user input is interpreted as, for example, "facility-data retrieval (object facility: restaurant-B")" (that is, "retrieve the facility data about restaurant-B"), it can be confirmed whether "restaurant-B" assigned to its argument can be used or not. If the user input includes the value, it notifies the value (the pattern (D). Thus, Yes in Step S1703. In this case, all values included in the user input can be collected.

Any configuration that employs, in Step S1703, a method of detecting the timing of prompting the data collection from the user input or the system falls within the scope of the embodiment.

The use-disapproval notice may notify not only "the value of the object cannot be used", but also "the value of the object has been deleted". If the user is informed of the deletion of the value, he or she will more probably refrain from accessing the object again.

Any embodiment falls within the scope of the embodiment if it can store unusable name-data items, as well as usable name-data items, can collect name-data items that may be used in the dialog with the user, from both the group of usable topics and the group of unusable topics and can output a use-disapproval notice if any unusable topic is found in the topics collected, The similarity between the first and second embodiments described above will be explained. The first embodiment and the second embodiment are essentially the same, except for the type of items that are managed to output use-disapproval notices. That is, the topic managing unit 103 manages topics, whereas the name-data managing unit 1403 manages name-data items. The topic updating units 104 and the name updating unit 1404 has a similar relation. And so do the use-disapproval-notice-output determining units 102 and 1402. The dialog promoting units 101 and 1401 performs the same function of determining that items should be collected to output a use-disapproval notice and of collecting such items, though they differ in terms of the condition of making that decision the condition of collecting the items.

As seen from FIG. 6 and FIGS. 17 and 18, the first and second embodiments can be said to perform the same operation. They differ from each other, nevertheless, as will be compared as follows.

The dialog promoting unit performs a dialog with the user (Step S201, Step S1701) and detects the termination of the dialog (Step S202, Step S1702). The dialog promoting unit determines whether items (topics or named-data items) should be collected to output a use-disapproval notice in response to an user input or in accordance with the state of the dialog (mainly, the time when the unit determines to prompt the user to input data) (Step S203, Step S1703).

If the dialog promoting unit determines to collect items to output a use-disapproval notice (Yes in Step S203, Yes in Step S1703), the condition of collecting items is set (Step S601, Step S1801). The items are then collected from the topic managing unit 103 or the name-data managing unit 1403, thereby to output a use-disapproval notice (Steps S602 and S603, Steps S1802 and S1803).

In accordance with whether the items collected include those that have become unusable (i.e., unusable items), the dialog promoting unit discriminates the contents of the use-disapproval notice (Step S205, Step S1705). If the use-disapproval notice should be output (Yes in Step S206, Yes in Step S1706), the notice, the contents of which has been discriminated, is output to the user (Step S207, Step S1707).

To use oral inputs, both the first embodiment and the second embodiment manage a speech-recognition grammar in association with the items. They combine the speech-recognition grammar for the speech-recognition engine, with the speech-recognition grammar for all name-data items, including usable ones and unusable ones. In view of this, the first and second embodiments can be said to operate in the same way to manage the speech-recognition grammar.

As set forth above, the first and second embodiments differ only in the type of items they manage in order to output a use-disapproval notice. In other words, they can be said to operate in the same way, even if they manage items of any other type, so long as the condition and method of collecting items remain unchanged. Hence, the dialog apparatus 100 that collects items in accordance with any user input and the state in which the dialog is going on and outputs a use-disapproval notice on the basis of the items collected falls within the scope of the embodiment.

Third Embodiment

In the first and second embodiments, use-disapproval notices are output for all items that have become unusable. The greater the number of items, the greater the number of notices is. If many use-disapproval notices are output, the user may not be well recognized. The present embodiment provides a dialog apparatus that controls the number of use-disapproval notices.

The dialog apparatus according to this embodiment is configured as shown in FIG. 1 or FIG. 14 and operates as shown in the flowchart of FIG. 2 or FIG. 17. This embodiment differs from the first and second embodiments in the operation the use-disapproval-notice-output determining unit 102 (1402) performs in Step S205 or Step S1705. How the use-disapproval-notice-output determining unit 102 (1402) operates will be explained below. For simplicity, the terminology concerning the first embodiment only will be used in the following description.

In the present embodiment, the use-disapproval-notice-output determining unit 102 controls the amount of data for the use-disapproval notices. For example, it limits the number of items to a threshold value. The threshold value is preset. Unusable items can be selected by any method available. The unit 102 informs the dialog promoting unit 101 of the items collected, so that the unit 101 may output use-disapproval notices.

The use-disapproval notices may be text messages. In this case, only the notices whose lengths are smaller than a predetermined value are output. The length of each notice is the number of characters constituting the notice or the time required to output the notice.

As mentioned above, the items for which use-disapproval notices are output are limited in numbers, thus reducing the amount of data constituting each notice. The use-disapproval notices output can therefore be more recognizable to the user.

Fourth Embodiment

In the third embodiment, the items for which use-disapproval notices are output are limited in numbers in order to control the amount of data involved, by using a simple threshold value. On the other hand, the present embodiment is configured to select more appropriately the items for which use-disapproval notices are output, in accordance with the state in which each item is used.

The dialog apparatus according to the present embodiment is configured as shown in FIG. 1 or FIG. 14 and operates as shown in the flowchart of FIG. 2 or FIG. 17. This embodiment differs from the first and second embodiments in the operation the use-disapproval-notice-output determining unit 102 (1402) performs in Step S205 or Step S1705. This embodiment differs from the first and second embodiments, also in the content of each item such as a topic or a name-data item. For simplicity, the terminology concerning the first embodiment only will be used in the following description.

How the use-disapproval-notice-output determining unit 102 selects items for which use-disapproval notices are output, in accordance with the state in which each item is used.

The unit 102 instructs the dialog promoting unit 101 to output use-disapproval notices for the items it has selected. How the use-disapproval-notice-output determining unit 102 operates will be described later in detail.

Figures 20, 21, 22:
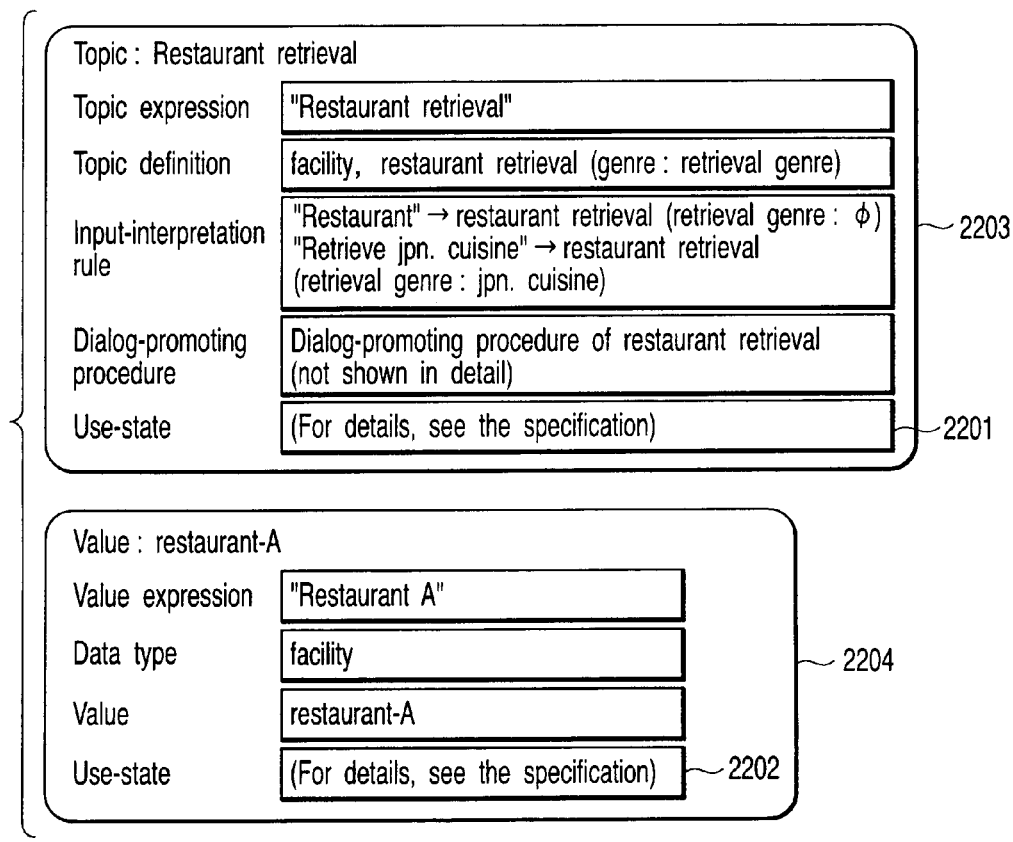
FIG. 20 is a diagram showing an example of a dialog performed in the second embodiment.
FIG. 21 is a diagram showing another example of a dialog performed in the second embodiment.
FIG. 22 is a diagram showing, in detail, the items used in a fourth embodiment.

FIG. 22 shows, in detail, the items used in the present embodiment. Shown in this figure are, for example, topic 2203 and name-data item 2204. The present embodiment is characterized in that use-state 2201 and use-state 2202 are added to the topic 2203 and the name-data item 2201, respectively.

Examples of use-states of each item may be: (1) the use frequency of the item; (2) the time when the item was used last; (3) the number of notices output for the item; (4) the number of times the item has been collected as unusable. These are use-states that the dialog promoting unit 101 can detect while undergoing the dialog with the user. These use-states are not reset every time the dialog apparatus 100 performs a dialog. Rather, they are counted over several dialogs the apparatus 100 performs. The use-states will be described in detail, and how the use-disapproval-notice-output determining unit 102 operates by using the use-states will be explained in detail.

(1) The use frequency of each item is the number of times the item is used while the dialog apparatus 100 is being used. If the item is a topic, the use frequency is the number of times the user talked about the topic with the dialog apparatus 100. If the item is a name-data item, the use frequency is the number of times the user referred to the value associated with the name-data item during the dialog.

The more frequently an item is used, the more intensely the user remembers the item. Therefore, if an item used often becomes unusable, the user must be informed of this fact at once. Hence, the use-disapproval-notice-output determining unit 102 selects this item as one for which a use-disapproval notice should be output, before any other items. For example, the unit 102 determines that a use-disapproval notice should be output for an item if the item has been used at a frequency higher than a threshold value.

(2) The time when the item was used last is the time when the item was used latest. If the item is a topic, it is the last time the user talked about the topic with the dialog apparatus 100. If the item is a name-item, it is the last time the user referred to the name-data item.

The more recently the user referred to an item, the more intensely he or she may remember the item. Therefore, if an item most recently referred to becomes unusable, the user must be informed of this fact at once. The use-disapproval-notice-output determining unit 102 therefore selects this item as one for which a use-disapproval notice should be output, before any other items. For example, the unit 102 determines that a use-disapproval notice should be output for an item if the item has been used before a threshold last-use time.

(3) The number of notices output for the item is the number of use-disapproval notices output for the item from the dialog apparatus 100. If the item is a topic, it is the number of the notices the user has received from the dialog apparatus 100 in connection with the topic. If the item is a name-data item, it is the number of the notices the user has received from the dialog apparatus 100 in connection with the name-data item.

The more use-disapproval notices the user has received about an item, the more intensely he or she may remember that the item has become unusable. In view of this, if a few use-disapproval notices have been output for an item that has become unusable, a use-disapproval notice for this item must be output before those for other items. Therefore, the use-disapproval-notice-output determining unit 102 selects this item as one for which a use-disapproval notice should be output, before any other items. For example, the unit 102 determines that a use-disapproval notice should be output immediately for an item if the number of notices output for this item is smaller than a threshold value.

(4) The number of times the item has been collected as unusable is the number of times the item has been collected as an unusable item while the dialog apparatus 100 is performing a dialog with the user in order to output use-disapproval notices.

The more times an item has been collected as unusable, the greater chance it could have been used in the dialog with the user. If a use-disapproval notice is output for the item, the user understands that the item cannot be used. If no use-disapproval notices are output for the item, the user proceeds with the dialog, without using the item because the user is little interested in this item. In either case, the more times the item is collected as unusable, the smaller the chance the user may use the item. Therefore, the use-disapproval-notice-output determining unit 102 selects this item as one for which a use-disapproval notice should be output, before any other items. For example, the unit 102 determines that a use-disapproval notice should be output immediately for an item if the number of notices output for this item is smaller than a threshold value.

In the present embodiment, the use-disapproval-notice-output determining unit 102 collects at least one of the use-states explained above and uses the use-state to determine whether a use-disapproval notice should be output. Two or more use-states may be used to determine whether a use-disapproval notice should be output. If this is the case, different priorities are imparted to the use-states. For example, the use frequency (1) may have higher priority than the number of notices (3), because the user is more interested in the use frequency than in the number of notices.

As described above, the various use-states in which items are used are recorded while the dialog apparatus 100 is operating, and an item for which a use-disapproval notice should be output is selected in accordance with the use-states thus recorded. The number of use-disapproval notices output is thereby reduced, ultimately controlling the amount of data involved. The dialog apparatus 100 can therefore output use-disapproval notices the user can easily understand.

Figures 23, 24:
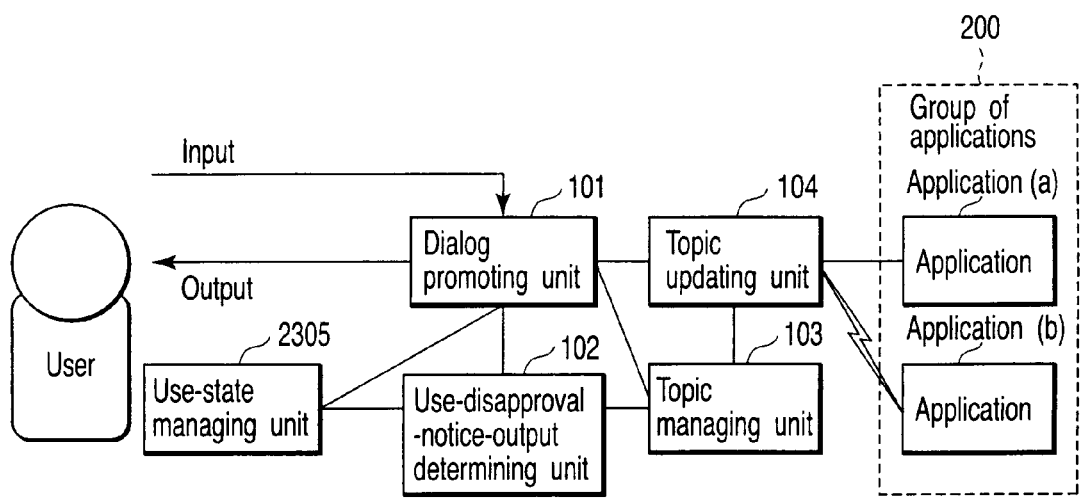
FIG. 23 is a diagram showing another configuration the fourth embodiment may have.
FIG. 24 is a diagram showing an example of a dialog and thus explaining a fifth embodiment.

In the example described above, the use-states are stored in association with the respective items as is illustrated in FIG. 22. This embodiment is not limited to this configuration, nonetheless. For example, a use-state managing unit 2305, i.e., an additional component, which is a database for managing the use-states, may be provided in the dialog apparatus 100 as shown in FIG. 23. In FIG. 23, the components identical to those shown in FIG. 1 are designated by the same reference numerals.

Owning to the use-state managing unit 2305, the data representing the use-states associated with the respective items become unnecessary. The use-disapproval-notice-output determining unit 102 refers to the contents of the use-state managing unit 2305 and selects items for which the use-disapproval notices should be output.

Not only in the dialog apparatus 100, but also outside the dialog apparatus 100, a use-state managing unit 2305 may be arranged. This use-state managing unit 2305 can be accessed via a network.

In the example described above, a threshold value is set to each use-state. Instead, different priorities may be imparted to the respective use-states. In this case, a threshold value may apply to the priority so that the use-disapproval notices may be output in limited numbers or in limited length.

Any configuration falls within the scope of the embodiment, if the use-states of the items are recorded while the dialog apparatus 100 is operating and the items for which use-disapproval notices are output are selected in accordance with the use-states of the items, thereby to reduce the amount of data used for the use-disapproval notices.

Fifth Embodiment

In the first and second embodiments, a use-disapproval notice is output for any item that has become unusable. This may not be necessary in some cases. In such a case, the dialog will last a long time if a use-disapproval notice is output. This is disadvantageous to the user. The present embodiment provides a dialog apparatus that outputs a use-disapproval notice more appropriately if nothing but unusable items are found.

The dialog apparatus according to the present embodiment is configured as shown in FIG. 1 or FIG. 14 and operates as shown in the flowchart of FIG. 2 or FIG. 17. This embodiment differs from the first and second embodiments in the operation of the use-disapproval-notice-output determining unit 102 (1402) performs in Step S205 or Step S1705. For simplicity, the terminology concerning the first embodiment only will be used in the following description.

In Step S204, the set of items collected to output use-disapproval notices is acquired from the dialog promoting unit 101. The set of items is supplied to the use-disapproval-notice-output determining unit 102. The items (topics or name-data items) collected are output in the form of a normal name-data group and an unusable name-data group. The normal name-data group consists of usable items. The unusable name-data group consists of unusable items.

In the present embodiment, the use-disapproval-notice-output determining unit 102 outputs a use-disapproval notice if the normal name-data group is empty, and determines not to output use-disapproval notices if the normal name-data group is not empty. This is because a usable item, if any, can be used to continue the dialog, and also because the use-disapproval notice for the unusable item will not be redundantly long if the user intends to use the unusable item. Note that any method can be used to select an item for which a use-disapproval notice should be output.

With reference to FIGS. 2, 5, 10 and 24, it will be explained in detail how the present embodiment operates if it is applied to a dialog system that utilizes a restaurant retrieval service. This system is similar to the system discussed in conjunction with the first embodiment. The topics involved are those shown in FIG. 5, and the dialog system assumes the state illustrated in FIG. 10.

Dialog Example 6

A dialog example shown in FIG. 24 will be explained.

The dialog starts with an input (USR24-1). Upon receiving this input the dialog promoting unit 101 determines that items should be collected to output a use-disapproval notice for this input (Yes in Step S203). If the user inputs an input "restaurant", it is input and collected as in the pattern (A), the normal data group is {"restaurant retrieval"}, and the unusable data group will be {"local restaurant retrieval"} (Step S204).

The use-disapproval-notice-output determining unit 102 receives the topics collected. The unit 102 determines that no use-disapproval notices should be output, because the normal data group is not empty (No in Step S205, Step S201). Then, the dialog promoting unit 101 gives a message (SYS24-1), showing the usable items. Further, the unit 101 gives a message (SYS24-2) to the user, prompting the user to input data.

Assume that the user wants "local restaurant retrieval", rather than "restaurant retrieval", and inputs USR24-2, specifically designating "local restaurant retrieval". In response to this user input, the dialog promoting unit 101 determines that items should be collected to output use-disapproval notices (Yes in Step S203). When the input "local restaurant retrieval" is input in the pattern (A) and collected, a normal data group { } and an unusable data group {"local restaurant retrieval"} are collected (Step S204).

The use-disapproval-notice-output determining unit 102 receives the topics collected. Since the normal data group is empty, the unit 102 determines that a use-disapproval notice should be output (Step S205). As a result, the dialog promoting unit 101 outputs a use-disapproval notice SYS24-3 (Yes in Step S206 Step S207).

Thus, a use-disapproval notice is output only if the use-disapproval-notice-output determining unit 102 determines that no usable items are available. This prevents unnecessary use-disapproval notices from being output.

For example, the user may allow the function of "restaurant retrieval" at the time SYS24-2 is output. In this case, USR24-2 will not be input, and the user will designate the genre the system has requested. Then, no use-disapproval notices will be required. The present embodiment is configured so that the user may allow the use of any usable item available.

In the present embodiment, use-disapproval notices are output only if no usable items are available, as described above. Hence, the outputting of unnecessary use-disapproval notices can be suppressed.

As indicated above, usable items are collected in order to output a use-disapproval notice, and whether a use-disapproval notice should be output is determined on the basis of the usable items collected. The present embodiment is not limited to this, nonetheless. For example, the application or a value database, not the database managing the items (e.g., topic managing unit 103), may be referred to, to determine whether any item that accords with the condition of collecting items is available.

Any configuration that can output a use-disapproval notice only if no usable items are available falls within the scope of the embodiment.

Sixth Embodiment

In the first and second embodiments, the items that have become unusable are not deleted and always used as objects for which use-disapproval notices may be output. However, a use-disapproval notice need not be further output once the user has understood, upon receiving use-disapproval notices, that he or she can no longer use any items. If a use-disapproval notice is repeatedly output for the same item, the dialog will be lengthened to be a redundant one. This is disadvantageous to the user. The present embodiment provides a dialog apparatus that appropriately deletes unusable items.

The dialog apparatus according to the present embodiment is configured as shown in FIG. 1 or FIG. 14. This embodiment differs in that the dialog promoting unit 101 (1401) and the topic updating unit 104 (or name updating unit 1404) performs additional functions. The flowchart therefore includes additional steps. However, the additional functions are performed, not because the items managed are of different types. For simplicity, the terminology concerning the first embodiment only will be used in the following description. Note that these additional functions may be performed in the second embodiment, too.

In the present embodiment, the topic updating unit 104 operates in the same way as the dialog promoting unit 101 of the first embodiment. It differs from the topic updating unit 104 of the first embodiment only in that it can delete topics from the topic managing unit 103. The topics that should be deleted are designated by the dialog promoting unit 101.

In this embodiment, the dialog promoting unit 101 operates in the same way as the dialog promoting unit 101 of the first embodiment. It differs from the dialog promoting unit 101 of the first embodiment in that it can designate to the topic updating unit 104 the topics that should be deleted. A method of designating such topics will be described later.

Figure 29:
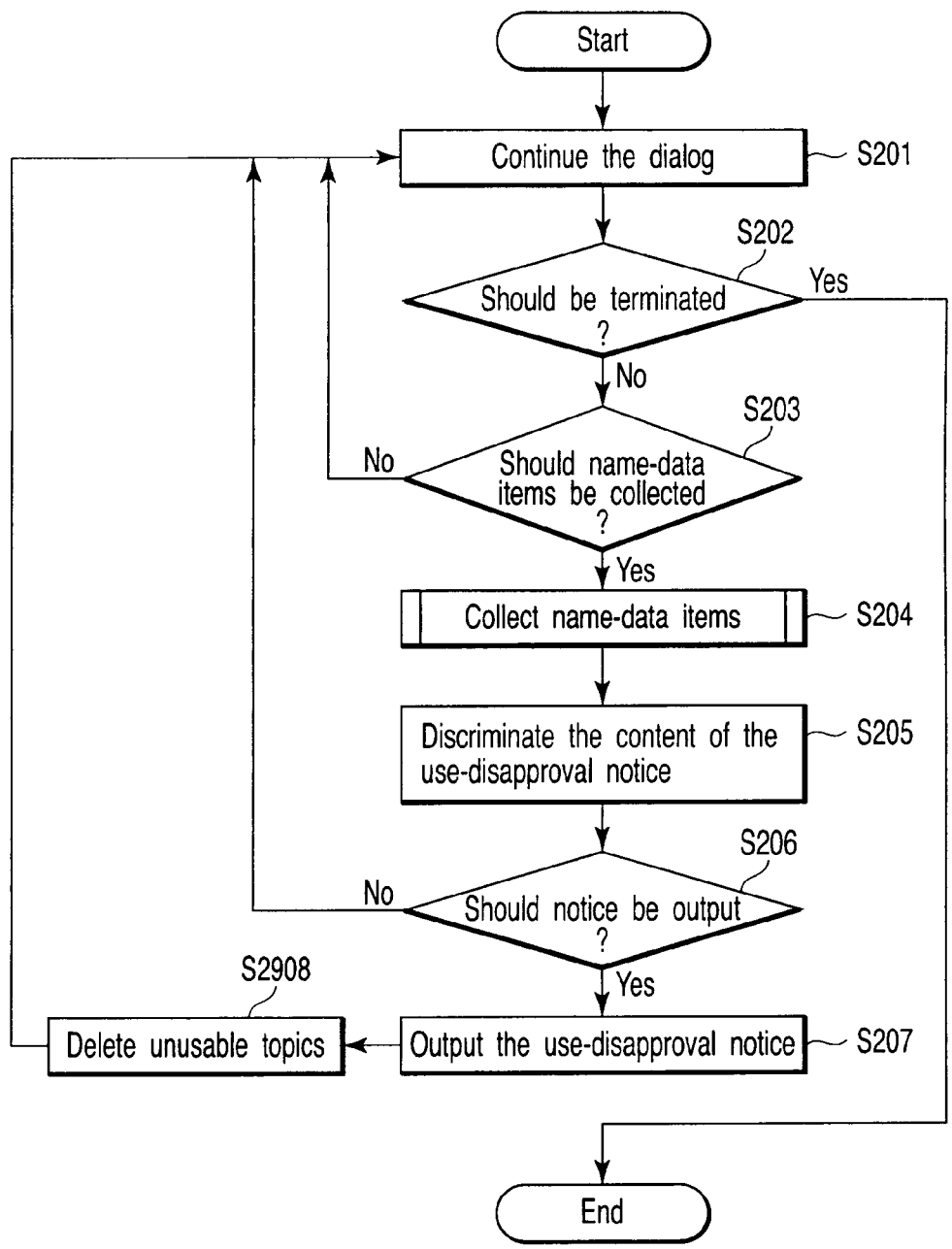
FIG. 29 is a flowchart explaining how a sixth embodiment operates.

How the present embodiment operates will be explained, with reference to FIG. 29. FIG. 29 is a flowchart explaining how the sixth embodiment operates. The operation of the sixth embodiment is essentially the same as the operation of the first embodiment. The steps identical to those shown in FIG. 2 are designated by the same numbers. The operation differs in that Step S2908 is added.

In Step S2908, unnecessary topics are deleted from the topic managing unit 103. The dialog promoting unit 101 designates the topics to be deleted and instructs the topic updating unit 104 to delete the topics designated. The topic updating unit 104 deletes the unnecessary topics the dialog promoting unit 101 has designated.

Thus the dialog apparatus operates in the sixth embodiment.

How the dialog promoting unit 101 designates unnecessary topics will be explained in detail. In the sixth embodiment, the dialog promoting unit 101 determines that the topics for which use-disapproval notices have been output in Step S207 should be deleted. The topics for which no use-disapproval notices have been output will be deleted. When the user receives a use-disapproval notice, he or she confirms that the topic can no longer be used. The topic therefore diminishes in terms of necessity. No great problems will arise if the unnecessary topic is deleted.

Assume that a use-disapproval notice SYS7-1 is output in Step S2-7 during the dialog example of FIG. 7. Then, in Step S2908, the topic "local restaurant retrieval" for which the notice SYS7-1 has been output is deleted from the topic managing unit 103. The dialog promoting unit 101 keeps performing the dialog with the user (Step S201). Alternatively, a use-disapproval notice SYS7-5 may be output. In this case, the topic "facility reservation" is deleted from the topic managing unit 103.

The topic for which a use-disapproval notice has been output to the user is thus deleted from the topic managing unit 103 in the present embodiment. That is, only the topics the user thinks will scarcely be used can be deleted, and a use-disapproval notice can be prevented from being repeatedly output for the same topic.

As mentioned above, the present embodiment can operate if the items managed to output use-disapproval notices are such name-items as in the second embodiment, instead of topics. In the dialog example of FIG. 20, for example, the name-data item concerning "restaurant-B" can be deleted from the name-data managing unit 1403 after the use-disapproval notice SYS20-1 has been output. As a result, repeatedly outputting the use-disapproval notice for the value "restaurant-B" can be suppressed.

In the first and second embodiments, a speech-recognition engine must perform speech recognition in order to accept oral inputs from the user. If unusable items are accumulated, speech-recognition grammars applicable to these items will be accumulated, too. The overall speech-recognition grammar set in the engine, i.e., combination of the speech-recognition grammars, will inevitably grow. The larger the overall speech-recognition grammar, the higher will be the possibility of speech-recognition errors. Speech-recognition errors cause malfunction of the dialog apparatus.

In the present embodiment, the speech-recognition grammars stored in association with the respective items (see, for example, FIGS. 25 and 28) are deleted when the items are deleted in Step S2908. Hence, if the items that may be scarcely used are deleted, the speech-recognition grammars associated with them, which will scarcely be used, either, will be deleted. This helps to suppress the growth of the overall speech-recognition grammar.

In the present embodiment, any item for which a use-disapproval notice has been output to the user is deleted as described above. The outputting of a new use-disapproval notice for the same item is therefore suppressed. Moreover, if oral inputs are used, the speech-recognition grammar applied to any item deleted is deleted, too, which suppresses the growth of the overall speech-recognition grammar.

In the example described above, Step S2908 of deleting a data-item is performed immediately after the use-disapproval notice has been output (Step S207). The present embodiment is not limited to this configuration. For example, it may be determined that an item should be deleted, upon lapse of a predetermined time from the outputting of a use-disapproval notice for that item, or the item may be deleted upon lapse of that predetermined time.

Data items may be managed independently of the associated items, such as speech-recognition grammars or input-interpretation rules. In this case, when the items are deleted, the associated items may be deleted, too. The dialog procedures, the input-interpretation rules, or the speech-recognition grammars are applied generally to all topics that may be used in the dialog system and therefore may hardly be deleted in part. It is therefore possible to reduce the probability of occurrence of topics in order to suppress the transition of the dialog to any one of the topics. The reduction of this probability can be regarded as deletion of data.

Any configuration that deletes, as described above, the items for which use-disapproval notices have been output to the user and also the speech-recognition grammars applied to the items falls within the scope of the embodiment.

Seventh Embodiment

The sixth embodiment deletes the items for which use-disapproval notices have been output. The present embodiment provides a dialog apparatus that more appropriately deletes items, suppresses the outputting of unnecessary use-disapproval notices, and deletes unnecessary speech-recognition grammars, on the basis of the states in which the items have been used.

The dialog apparatus 100 according to this embodiment is configured as shown in FIG. 1 or FIG. 14 and operates as shown in the flowchart of FIG. 29. This embodiment differs from the sixth embodiment in the operation the dialog promoting unit 101 (1401) performs in Step S2908. This embodiment differs from the sixth embodiment, also in the composition of items, such as topics or name-data items.

The operation of the unit 101 and the composition of data of items will be described below. For simplicity, only the terminology concerning the first embodiment, which are used to explain the sixth embodiment, too, will be used in the following description.

In the present embodiment, the operation of the unit 101 selects the items that should be deleted, from the unusable topics (items) stored in the topic managing unit 103. The unit

101 selects such items on the basis of the states in which the items have been used. The result of this selection is notified to the topic updating unit 104 so that the items selected may be deleted from the topic managing unit 103. The use-states of the items and the method of selecting these items will be described later.

FIG. 22 is a diagram showing, in detail, the items used in the present embodiment. Shown in FIG. 22 are topic 2203 and name-data item 2204. The topic 2203 and the name-data item 2204 include use-states 2201 and 2202, respectively. This characterizes the present embodiment.

As in the fourth embodiment, examples of use-states of each item may be: (1) the use frequency of the item; (2) the time when the item was used last; (3) the number of notices output for the item; (4) the number of times the item has been collected as unusable. These are use-states that the dialog promoting unit 101 can detect while undergoing the dialog with the user. These use-states are not reset every time the dialog apparatus 100 performs a dialog. Rather, they are counted over several dialogs the apparatus 100 performs. The use-states will be described in detail, and how the unit 101 determines the items that should be deleted, by using the use-states will be explained in detail.

(1) The use frequency of each item is the number of times the item is used while the dialog apparatus 100 is being used. If the item is a topic, the use frequency is the number of times the user talked about the topic with the dialog apparatus 100. If the item is a name-data item, the use frequency is the number of times the user referred to the value associated with the name-data item during the dialog.

The more frequently an item is used, the more intensely the user remembers the item. Therefore, even if an item frequently used becomes unusable, the user may try to use the item. Conversely, the user may scarcely try to use an item that has been seldom used. Hence, the dialog promoting unit 101 selects such items as those to be deleted. That is, the unit 101 selects, for example, any item that has been used at a frequency smaller than a predetermined threshold value. Particularly, any item used at frequency zero (0), which can be said to be unknown to the user and for which no use-disapproval notices need to be output, should be deleted.

(2) The time when the item was used last is the time when the item was used latest while the dialog apparatus 100 is operating. If the item is a topic, it is the last time the user talked about the topic with the dialog apparatus 100. If the item is a name-data item, it is the last time the user referred to the value related to the name-data item.

The more recently the user referred to an item, the more intensely he or she may remember the item. Therefore, even if the item most recently referred to has become unusable, the user may try to use this item. Conversely, the user may not be interested in an item referred to long before. Therefore, the unit 101 selects the item used long before, as one to be deleted. That is, the unit 101 selects, for example, any item that has been used before a predetermined threshold time, as one that should be deleted.

(3) The number of notices output for the item is the number of use-disapproval notices output for the item while the dialog apparatus 100 is operating. If the item is a topic, it is the number of the notices the user has received from the dialog apparatus 100 in connection with the topic. If the item is a name-data item, it is the number of the notices the user has received from the dialog apparatus 100 in connection with the name-data item.

The more use-disapproval notices the user has received about an item, the more intensely he or she may remember that the item has become unusable. Therefore, the unit 101 selects any item for which many use-disapproval notices have been output, as one that should be deleted. The unit 102 selects, for example, an item for which use-disapproval notices have been output in numbers that exceed a threshold value.

(4) The number of times the item has been collected as unusable is the number of times the item has been collected as an unusable item while the dialog apparatus 100 is operating, in order to output use-disapproval notices.

The more times an item has been collected as unusable, the greater chance it could have been used in the dialog with the user. If a use-disapproval notice is output for the item, the user understands that the item cannot be used. If no use-disapproval notices are output for the item, the user proceeds with the dialog, without using the item because the user is little interested in this item. In either case, the more times the item is collected as unusable, the smaller the chance the user may use the item. Therefore, the use-disapproval-notice-output determining unit 102 selects this item as one to be deleted. The unit 102 selects, for example, any item for which use-disapproval notices have been output in numbers exceeding a threshold value, as ones that should be deleted.

In the present embodiment, the dialog promoting unit 101 collects at least one of the use-states explained above and uses the use-state to select items that should be deleted. Two or more use-states may be used in combination to select such items. In this case, different priorities are imparted to the use-states. For example, the use frequency (1) may have a higher priority than the number of notices (3), because the user is more interested in the use frequency than in the number of notices.

In the present embodiment, the speech-recognition grammars applied to items may be deleted as the items are deleted, as in the sixth embodiment. In the present embodiment, all items to be deleted are unusable ones. Thus, even those for which no use-disapproval notices have been output may be deleted. This effectively helps to prevent the overall speech-recognition grammar from growing.

As described above, the various use-states in which items are used are recorded while the dialog apparatus 100 is operating, and those of the unusable items, which should be deleted, are selected, and the items thus selected are appropriately deleted. Therefore, the outputting of unnecessary use-disapproval notices is suppressed, and the overall speech-recognition grammar is prevented from growing.

In the example described above, the process of deleting items (Step S2908) follows the process of outputting use-disapproval notices (Step S207). This is merely because importance is put on updating of the use-states, such as (3) the number of notices output and (4) the number of times the item has been collected as unusable. If use-states, such as (1) the use frequency of the item and (2) the time when the item was used last, are regarded as important, items can be deleted at any desired timing, irrespective of the outputting of use-disapproval notices. They may be deleted when unusable items increase in numbers due to the deletion of applications or values, when user inputs are made, when the use frequency is updated, at regular intervals, or when the dialog is started. Alternatively, items may be deleted at two or more of the timings exemplified here.

In the example described above, the dialog promoting unit 101 checks all unusable items, determining whether they should be deleted or not. Instead, the unit 101 may check only those of the unusable items which have been collected and for which use-disapproval notices should be output. This serves to shorten the time required to determine whether the items should be deleted or not.

In the example described above, the use-states are stored in association with the respective items as is illustrated in FIG. 22. This embodiment is not limited to this configuration, nonetheless. For example, a use-state managing unit 2305, i.e., an additional component, which is a database for managing the use-states, may be provided as shown in FIG. 23. In such a case, the data representing the use-states, stored in association with the respective items, is unnecessary. The use-disapproval-notice-output determining 102 refers to the contents of the use-state managing unit 2305, thereby to select items for which use-disapproval notices should be output.

Not only in the dialog apparatus 100, but also outside the dialog apparatus 100, a use-state managing unit 2305 may be arranged. This use-state managing unit 2305 can be accessed via a network.

Since the use-states are managed independently of the items as described above, they may be deleted as some items are deleted. If any use-state, such as the use frequency, is not deleted at all, it can be used to determine whether use-disapproval notices should be output for similar items.

Any configuration that selects unusable items to be deleted, on the basis of the use-state of the items, which are recorded while the dialog apparatus 100 is operating, falls within the scope of the embodiment.

Eighth Embodiment

The sixth and seventh embodiments are advantageous in that unnecessary items are deleted, preventing the overall speech-recognition grammar from growing. Assume, however, that various expressions are allocated to one oral-input item, making it possible to delete the speech-recognition grammar applied to expression levels. Then, an adaptive speech-recognition grammar can be edited. Therefore, in the present embodiment, all items that have become unusable are not deleted. Rather, this embodiment provides a dialog apparatus that deletes a part of the speech-recognition grammar, which is applied to the items no longer usable.

The dialog apparatus 100 according to this embodiment is configured as shown in FIG. 1 or FIG. 14. This embodiment differs from the sixth and seventh embodiments in the functions the dialog promoting unit 101 (1401) and the topic updating unit 104 (or name updating unit 1404) perform. Thus, the flowchart showing the operation is a modification of that for the sixth and seventh embodiments. For simplicity, only the terminology concerning the first embodiment, which is used to explain the sixth and seventh embodiment, too, will be used in the following description.

The dialog promoting unit 101 performs operations that are essentially identical to the operations the dialog promoting unit 101 performs in the first embodiment. In this embodiment, the unit 101 selects an input pattern (e.g., 2604 shown in FIG. 26, or the like) that should be deleted from the speech-recognition grammar applied to topics. The dialog promoting unit 101 notifies the results of collecting items, to the topic updating unit 104 so that the items selected may be deleted. The items to be deleted and the method of selecting these items will be described later.

The topic updating unit 104 performs operations that are essentially identical to the operations the topic updating unit 104 performs in the first embodiment. In this embodiment, the unit 104 can edit (delete) the speech-recognition grammar related to topics, in units of input patterns. The input patterns correspond to the parts of the speech-recognition grammar, which express items, respectively. The input patterns that should be deleted are notified by the dialog promoting unit 101.

Figure 30:
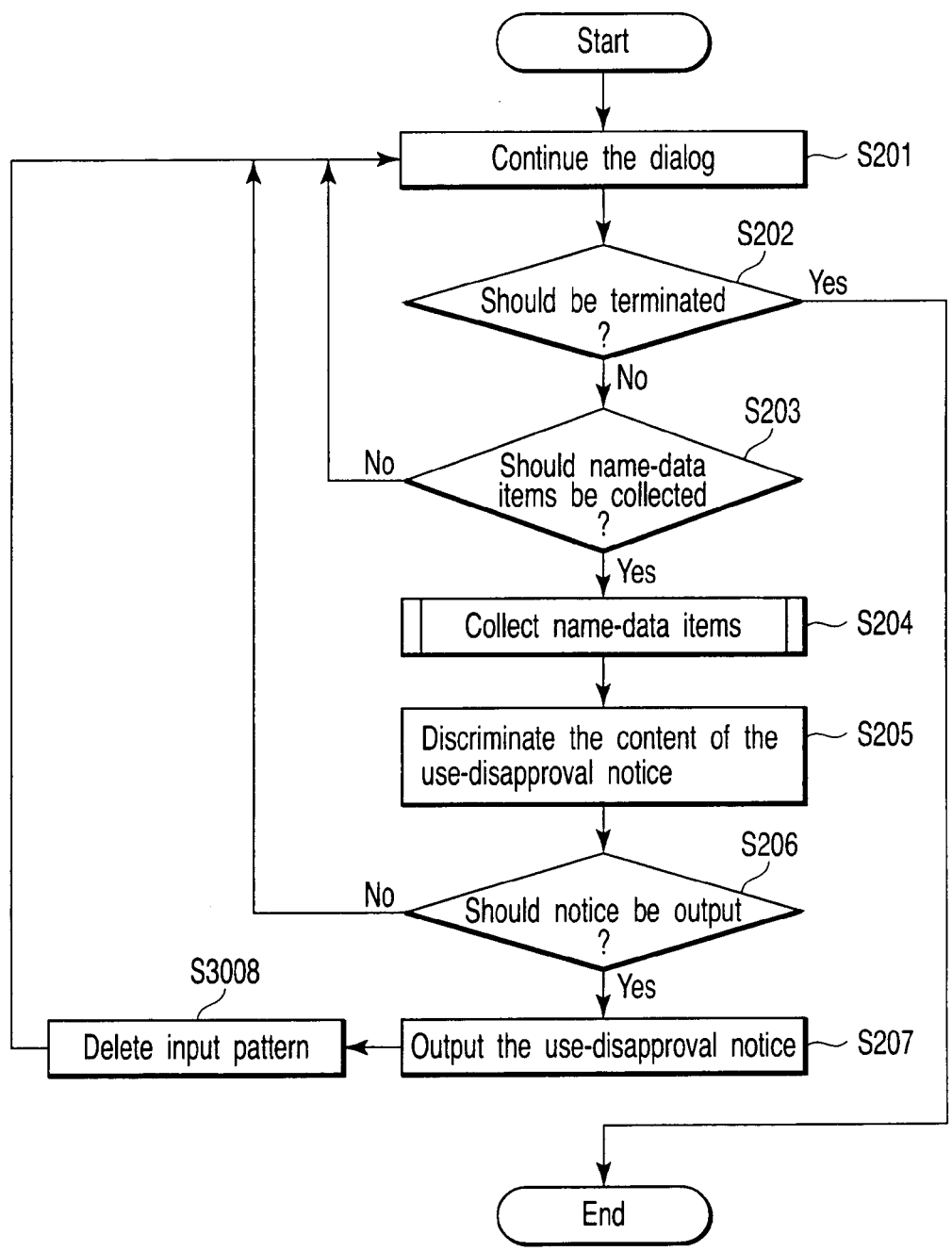
FIG. 30 is a flowchart explaining how an eighth embodiment operates.

How the present embodiment operates will be explained, with reference to FIG. 30. FIG. 30 is a flowchart explaining how the eighth embodiment operates. The operation of the eighth embodiment is essentially the same as the operation of the first embodiment. The steps identical to those shown in FIG. 2 are designated by the same numbers. The operation differs in that Step S3008 is added.

In Step S3008, unnecessary input patterns are deleted from the topic managing unit 103. The dialog promoting unit 101 designates the topics whose input patterns are be deleted, selects the input patterns to be deleted, and instructs the topic updating unit 104 to delete the input patterns designated. The topic updating unit 104 deletes the unnecessary input patterns the dialog promoting unit 101 has designated. Thus the dialog apparatus operates in the eighth embodiment.

How the dialog promoting unit 101 selects topics whose input patters should be deleted and the input patterns that should be deleted will be explained in detail. To designate the topics whose input patterns should be deleted, the condition of collecting items (topics), used in the sixth and seventh embodiments, are utilized. However, the threshold value for determining whether to delete input patterns is different from the threshold value for determining whether to delete any topics. The former is moderate in comparison with the latter. For example, if the threshold value is the use frequency used in the seventh embodiment, any topic more often used than the threshold value set to delete items is selected as an item whose input pattern should be deleted. This is because the item to be deleted may scarcely be talked about by the user, and the input patterns that should be maintained may therefore be reduced in numbers.

After a topic whose input patterns should be deleted is selected, the input patterns to be deleted from the speech-recognition grammar applied to the topic are then selected. A method of selecting the input pattern is, for example, to "maintain representative expressions". An example of the representative expressions is the name of the topic. In the example of FIG. 26, the grammar 2601 for the topic "facility reservation" describes the name 2604 of the topic. A representative input pattern may be designated beforehand, by its designer. The dialog promoting unit 101 selects, as an input pattern to delete, any input pattern other than the representative input pattern.

To select an input pattern to delete, a method of "maintaining an input pattern that is frequently used" may be employed. To implement this criterion of selection, the use frequencies of various input patterns, which accord with the user inputs, are recorded while the dialog apparatus 100 is operating. In the example of FIG. 26, if the use-frequency record shows that the user has input "Reserve XX" many times, the dialog promoting unit 101 will select the input pattern that should be deleted from the grammar 2601 for the topic so that the input pattern 2605 may be maintained.

To select an input pattern to delete, another method of "maintaining a new input pattern at its last-use time" may be employed. The last-use time of the input pattern is the time the pattern accorded with the user input last. To use this criterion of selection, the last-use time of each input pattern is recorded while the dialog apparatus 100 is operating. In the example of FIG. 26, if the last-use time of the user input "Reserve XX" is found to be new on the basis of the recorded use frequency, the dialog promoting unit 101 will select input patterns to be deleted from the grammar 2601 for the topic so that the input pattern 2605 may be maintained.

In the example described above, topics are exemplified as items whose input patterns should be deleted. Instead, the input patterns of name-data items may be deleted in the same way. For example, two input patterns are registered in the speech-recognition grammar 2603 applied to name-data items. If the user uses "Restaurant O" many times, the input pattern "Restaurant O, Branch X" may be deleted, in order to maintain other input patterns that are used at a high frequency.

As indicated above, all items that have become unusable are not deleted in this embodiment. Rather, a part of the speech-recognition grammar applied to the items rendered unusable is deleted, as indicated above. Hence, the reduction in the number of items is suppressed, and the speech-recognition grammar can yet be prevented from growing.

In the example described above, the items are stored in association with the speech-recognition grammars as is illustrated in FIG. 25 or FIG. 28. Nonetheless, the embodiment is not limited to this configuration. The items may be managed independently of the associated items, such as speech-recognition grammars or input-interpretation rules. In this case, when it is determined that some items should be deleted, the speech-recognition grammar associated with these items are deleted, too. The dialog procedures, the input-interpretation rules, or the speech-recognition grammars are applied generally to all topics that may be used in the dialog system and therefore may hardly be deleted in part. Therefore, it is possible to reduce the probability of occurrence of topics in order to suppress the transition of the dialog to any one of the topics. The reduction of this probability can be regarded as deletion of data.

The input pattern for a certain item may be deleted all at a time, or gradually step by step. To delete the input patterns step by step, several threshold values for deleting input patterns are preset. When it is determined that the input pattern of a certain item should be deleted, this input pattern is identified in accordance with which threshold value it corresponds to.

In the example described above, the step 3008 of deleting input patterns immediately follows the step (Step S207) of outputting use-disapproval notices. The embodiment is not limited to this configuration, nevertheless.

If the condition used in the sixth embodiment is applied to delete an input patterns, it may be determined that the input pattern should be deleted after a specific number of user inputs have been made or when a predetermined time expires.

If the condition used in the seventh embodiment is applied to delete an input pattern, and if the use-states, such as (1) the use frequency of the item and (2) the time when the item was used last, are regarded as important, the patterns of inputting items can be deleted at any desired timing, regardless of the outputting of use-disapproval notices. They can be deleted when unusable items increase in numbers due to the deletion of applications or values, when user inputs are made, when the use frequency is updated, at regular intervals, or when the dialog is started. Alternatively, the input patterns may be deleted at two or more of the timings exemplified here.

Any configuration that deletes, as described above, a part of the speech-recognition grammar applied to the items rendered unusable falls within the scope of the embodiment.

Ninth Embodiment

The embodiments described thus far are designed on the assumption that only one user uses the dialog apparatus 100. If used by two or more users, however, the dialog apparatus 100 cannot output appropriate use-disapproval notices, since use-disapproval notices are output on the basis of the dialog the user performs with the apparatus 100. Therefore, the use-disapproval notices change in contents if another user performs a dialog with the apparatus 100. Further, since the apparatus 100 operates in accordance with the condition in which the user utilizes items as in the fourth and seventh embodiments, it may fail to operate well when used by another user, in some cases. In view of this, the present embodiment provides a dialog apparatus that outputs use-disapproval notices and deletes unusable items, by utilizing the use-histories of individual users. Use-disapproval notices are output and the use-disapproval notices are deleted, with reference to the database (i.e., topic managing unit 103 or name-data managing unit 1403) on the basis of the unusable items stored in this database and the use-state of each item referred to, thereby to determine whether a use-disapproval notice should be output for each item and whether each item should be deleted. Thus, use-disapproval notices can be output and items can be deleted, appropriately in accordance with the use history of each user. That is, the present embodiment provides a dialog apparatus that performs a process of constructing a database that manages items, by using the use-histories of the users.

The present embodiment is a combination of the first embodiment and a unit of performing the formulating use-histories will be described below. Nonetheless, use-histories can be formulated in the same way, also in the other embodiments.

Figure 31:
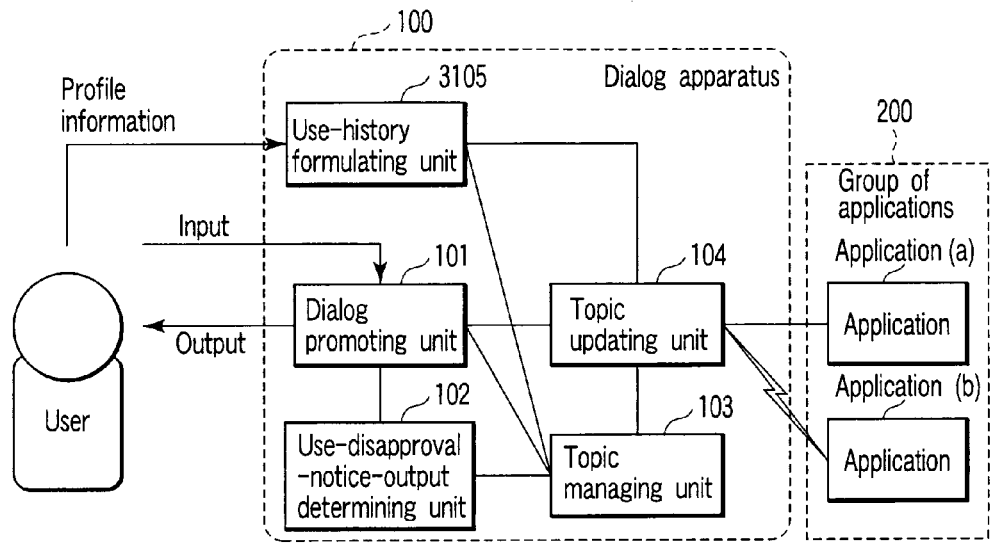
FIG. 31 is a diagram showing the configuration of a ninth embodiment.

FIG. 31 is a diagram showing the configuration of a dialog apparatus 100 according to the present embodiment. The present embodiment is essentially identical to the first embodiment in configuration and operation. It differs from the first embodiment in that a use-history formulating unit 3105 is provided in addition to the other components. The unit 3105 enables the apparatus 100 to perform processes before and after a dialog with the user.

More precisely, (i) the use-history of a user is formulated before a dialog with the user starts (before the log-in, for example) and stored in the topic managing unit 103; (ii) a dialog with the user is performed in accordance with the contents of the topic managing unit 103; and (iii) the use history stored in the topic managing unit 103 is incorporated into the user data when the dialog ends (at the log-out, for example). The process (ii) of performing the dialog with the user is the dialog process that has been explained in conjunction with the embodiments described above. The use-history formulating unit 3105 of this embodiment is configured to perform the processes (i) and (iii). The use-history formulating unit 3105 will be described below.

The use-history formulating unit 3105 formulates a use-history of a user who performs a dialog with the dialog apparatus 100. The use-history formulated in stored in the topic managing unit 103. In the process of formulating a use-history, use-history data is extracted from the user data and updated in accordance with the difference between the use-history data and the present state of the dialog apparatus 100 (topic usable/unusable). The use-history data and the process of formulating the use-history will be described later in detail. Various methods can be used to extract the use-history data. The use-history data may be exacted by, for example, acquiring it from a recording medium the user has or from a storage area or a server accessed on the basis of the user ID.

The use-history formulating unit 3105 acquires a topic-registering state from topic managing unit 103 when the dialog with the user ends. The topic-registering state is registered as use-history data in the user data. It can be registered at various locations, such as the medium that the user has or a storage area or a server that has been accessed on the basis of the user ID.

The use-history data will be described in detail. Like the data stored in the use-history data, the use-history data consists of a normal-topic group and an unusable-topic group. These groups of topics describe the state the dialog apparatus 100 assumes when it performs the latest dialog with the user. Therefore, they are data that can express the use-history of the user. Particularly, the groups of topics are data that shows in detail the use-history of each user if the use-states are stored in association with the topics as in the fourth embodiment.

The process of formulating a use-history will be explained. This is a process of extracting topics that are unusable now (at the time the process is performed), from the normal-topic group registered in the use-history data about a user, and transfers these topics to the unusable-topic group. The normal-topic group is constituted by topics that can be used at present. Whether a topic can be used now is determined by using the topic updating unit 104, in accordance with whether the application applied to the topic can be utilized or not. This process can be said to apply all applications generated after the user terminated a dialog before starts a new dialog the topic managing unit 103.

In the present embodiment, the topic managing unit 103 stores the use-histories of the users as described above. Use-disapproval notices based on the use-history of any user can be output during the dialog with the user.

As described above, the data units in which the use-history data is managed are not limited to topics. The dialog apparatus 100 of FIG. 31 is no more than a combination of the first embodiment and the use-history formulating unit 3105. The use-history data is no more than data that is classified into normal items and unusable items. Hence, the second embodiment can operate in the same way as described above, if the use-history formulating unit 3105 is added to the second embodiment and if the name-data items are classified into normal items and unusable items.

As described above, the present embodiment has a database in which items are managed on the basis of the use-histories of the users. Therefore, this embodiment can perform processes, such as outputting use-disapproval notices during the dialog, on the basis of the use-histories of the users.

As indicated above, all use-history data is acquired from the users. The present embodiment is not limited to this configuration. For example, the data representing the time of the last dialog with the user may be stored, and the dialog apparatus 100 may store the data representing the transition of usable items. In this case, the items usable at the time of the last dialog can be acquired and compared with the items usable at present, thereby determining the items that have become unusable. Therefore, the use-history data can be generated for each user, only if the items that were unusable at the time of the last dialog are stored in the form of a list. Alternatively, the data representing the data-item transition, from usable ones to unusable ones, and vice versa, may be stored. Then, the use-history data can be constituted by time-data items only.

In the present embodiment, it not necessary to store all usable items, either. For example, only the items that the user has used may be stored as usable ones. If this is the case, the fact that the topics once used but no longer usable can be registered in the use-history in the process of formulating the use-history. This can achieve the same advantage as attained through the data-item deletion performed on the basis of use-frequency in the seventh embodiment.

Any configuration that constructs a database for managing items in accordance with the users' use-histories and uses the database to determine whether to output use-disapproval notices falls within the scope of the embodiment.

Tenth Embodiment

In the first and second embodiments, use-disapproval notices are output for all items that have become unusable. Instead of outputting use-disapproval notices for the respective items of a group, which have become unusable, a use-disapproval notice may be output for all items of the group. This would be more useful to the user. The present embodiment provides a dialog apparatus that outputs one use-disapproval notice for all items of a group.

The dialog apparatus 100 according to this embodiment is configured as shown in FIG. 1 or FIG. 14 and operates as shown in the flowchart of FIG. 2 or FIG. 17. This embodiment differs from the first and second embodiments in the operation the use-disapproval-notice-output determining unit 102 (1402) performs in Step S205 or Step S1705. It differs also in that related data is added to each item. How the use-disapproval-notice-output determining unit 102 (1402) operates will be described below in detail. For simplicity, the terminology concerning the first embodiment only will be used in the following description.

Figure 32:
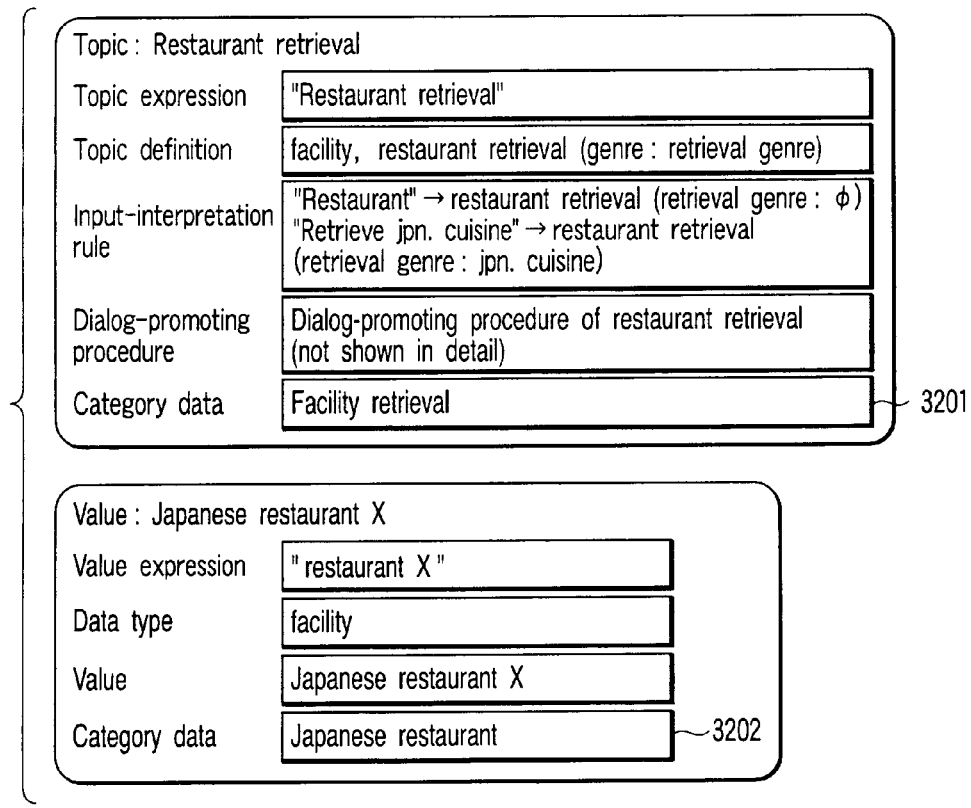
FIG. 32 is a diagram showing, in detail, an example of an item that is managed in a tenth embodiment.

FIG. 32 shows an example of an item that is managed in this embodiment. In the present embodiment, a "category data" (3201, 3202) is added to each item. The category data represents the category of the item. For example, "restaurant retrieval", for example, is a "facility retrieval" category for topics about the retrieval of a facility, value "Japanese restaurant X" is a "Japanese restaurant" category for topics about "Japanese cuisine".

In the present embodiment, the use-disapproval-notice-output determining unit 102 outputs a use-disapproval notice for a category when all items of this category have become unusable. For example, all values of category "Japanese restaurant" may become unusable. In this case, the unit 102 outputs a use-disapproval notice "You cannot choose any Japanese restaurants". So notified, the user can understand that all items that may belong to the category, not one item belonging to the category, have become unusable.

Step S205, which the use-disapproval-notice-output determining unit 102 performs in the present embodiment, will be explained. The dialog promoting unit 101 supplies to the 102 the data collected in Step S204 and consisting of a normal-data group and an unusable-data group.

The use-disapproval-notice-output determining unit 102 determines whether the unusable-data group includes an item that can be used for the category to which all items of the group belong. That is, an item that may belong to the normal-data group is searched for. Alternatively, the normal-name-data managing unit 1602 may be searched for. If such an item is acquired as a result of this data retrieval, it is determined that the unusable-data group includes a item that can be used.

If the unusable-data group includes an item that can be used, the use-disapproval-notice-output determining unit 102 determines that no use-disapproval notices should be output for the category, and outputs a use-disapproval notice for each item. On the other hand, if the unusable-data group includes no items that can be used, the unit 102 outputs a use-disapproval notice for all items belonging to the same category. This use-disapproval notice for all items belonging to the same category may not be output at all.

For example, assume that the unusable-data group obtained in Step S204 includes topic "restaurant retrieval" and topic "local restaurant retrieval", both belonging to the category "facility retrieval", and does not include any usable topic that belongs to the category "facility retrieval". Then, the use-disapproval-notice-output determining unit 102 determines that a use-disapproval notice, "You cannot use the facility retrieval", should be output for the category.

Assume that an unusable-data group collected in Step S204 includes name-data items "Japanese restaurant X" and "Japanese restaurant Y", both belonging to category "Japanese restaurants", and that there are no usable name-data items belonging to category "Japanese restaurants". In this case, the use-disapproval-notice-output determining unit 102 determines that a use-disapproval notice, "You cannot use the Japanese restaurants", should be output for the category.

When a use-disapproval notice is output for a category, the user can be informed of the fact that all items belonging to the category have become unusable. If the user receives a use-disapproval notice for a item, he or she may understand that A cannot be used, but B similar to A can be used". In view of this, the use-disapproval notice for all items of a category more clearly tells the user that all items belonging to the category are unusable.

Thus, in the present embodiment, the items managed are classified in accordance with the categories they belong to. If all items belonging to the same category are unusable, a use-disapproval notice is output. This notice is easier for the user to understand.

As described above, the category data is stored in association with the items belonging to the category. The embodiment is not limited to this configuration, nevertheless. A database from which the category data can be acquired may be used, in addition to the database that manages the items. If the items are topics, they may be classified into categories in accordance with output-data types. If the items are name-data items, they may be classified into categories in accordance with the value-data types.

The use-disapproval-notice-output determining unit 102 outputs use-disapproval notice for categories, respectively. Instead, a category, e.g., "restaurant", may be defined, encompassing a lesser category, "Japanese restaurant". If this is the case, a use-disapproval notice may be output for the category "restaurant".

Once a use-disapproval notice has been output for the items of a certain category, use-disapproval notices need not be output for the items belonging to the category.

Any configuration that classifies the items to be managed, in accordance with categories, and outputs a use-disapproval notice for each category if all items belong of the category are unusable, as described above, falls within the scope of the embodiment.

Eleventh Embodiment

The first and second embodiments output use-disapproval notices for respective items that have become unusable. Each use-disapproval notice shows only that the item can no longer be used. No items can be provided to substitute the item no longer usable. This may disable the user from inputting anything to continue the dialog. The present embodiment provides a dialog apparatus that can present to the user a substitute for any item that has become unusable.

The dialog apparatus 100 according to this embodiment is configured as shown in FIG. 1 or FIG. 14 and operates as shown in the flowchart of FIG. 2 or FIG. 17. This embodiment differs from the first and second embodiments in the operation the dialog promoting unit 101 (1401) performs in Step S207 or Step S1707. It differs also in that related data is added to each item. How the dialog promoting unit 101 (1401) operates will be described below in detail. For simplicity, the terminology concerning the first embodiment only will be used in the following description.

Figure 33:
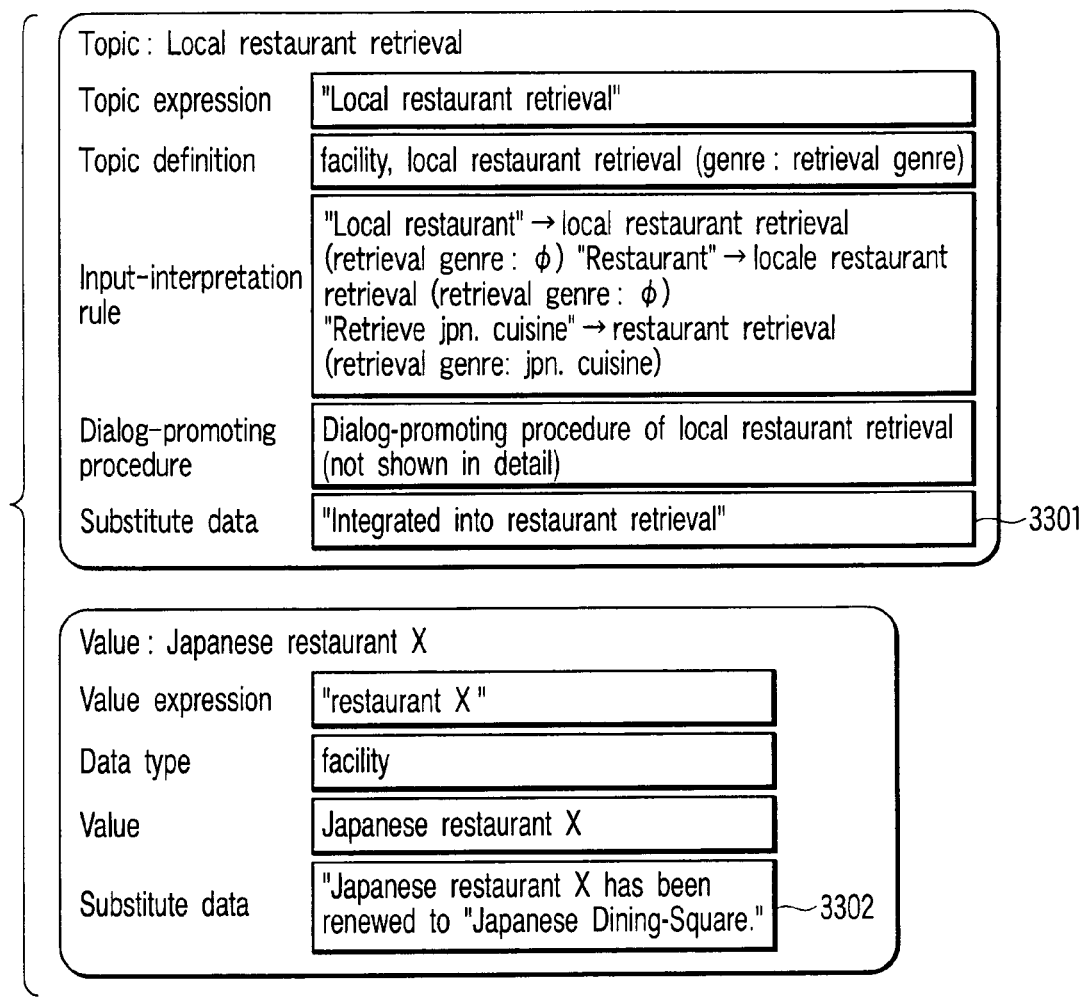
FIG. 33 is a diagram showing, in detail, an example of an item that is managed in an eleventh embodiment.

FIG. 33 shows an example of an item that is managed in this embodiment. In the present embodiment, a "substitute data" (3301, 3302) is added to each item. The substitute data is an item that can be used in place of an item for which a use-disapproval notice has been output. If a topic "local restaurant retrieval", for example, has become unusable, a substitute item "Local restaurant retrieval has been integrated into restaurant retrieval" (3301) is generated. If value "Japanese restaurant X" has become unusable, a substitute item "Japanese restaurant X has been renewed to Japanese Dining-Square" (3302) is generated. Such a substitute item is externally supplied to the topic updating unit 104. The topic updating unit 104 updates the item to the substitute item.

In the present embodiment, the dialog promoting unit 101 determines whether a substituted item has been registered for the item to output, before it outputs a use-disapproval notice in Step S207. If a substitute item has been registered, the dialog promoting unit 101 extracts the substitute item and outputs it, together with a use-disapproval notice. Thus, the dialog promoting unit 101 can output a message such as "You cannot use local restaurant retrieval (use-disapproval notice), Integrated into restaurant retrieval (substitute item)", or "restaurant X cannot be used" (use-disapproval notice), restaurant X has been renewed to Japanese Dining-Square (substitute item)".

A substitute item is thus output, along with a use-disapproval notice. Therefore, the user can be reliably guided to usable items. Unless the user receives the substitute item, he or she has no way to know, for example, that Japanese restaurant X has been renewed to "Japanese Dining-Square". Consequently, he or she can have no access to the updated item.

As indicated above, substitute items are managed in association with the items, and a use-disapproval notice is output, together with a substitute item. The user can therefore be reliably guided to usable items.

In this embodiment, substitute items are stored in association with the corresponding items. Nonetheless, the embodiment is not limited to this configuration. A database from which substitute items can be may be used, in addition to the database that manages the items.

Any configuration that can manage substitute items in association with items managed, and can present the substitute items together with the items managed falls within the scope of the embodiments.

In the embodiments described above, use-disapproval notices, each notifying that a item has become unusable while the dialog apparatus 100 is operating, performing a dialog with a user, in response to a user input or as the dialog goes on.

Any dialog apparatus according to the embodiments have been described as a configuration independent of applications. The embodiments can, however, be applied to a dialog apparatus that has functions of applications. For example, a dialog apparatus according to the embodiments may have a database which manages items to be presented to users and can acquire from the database any items that accord with the conditions the user has shown. In such a dialog apparatus, the processes of acquiring database-retrieving conditions is obtained though a dialog with the user, retrieving the database in accordance with the retrieval condition, and making responses to the user are application functions, and the acquisition of the database-retrieving conditions is a topic in the definition of the embodiments.

Even in a dialog apparatus that has various functions other than the database retrieval, to perform a dialog with the user, thereby to set the operating conditions of the functions and ultimately to perform the functions, can be considered identical to the function of application. Even in a configuration that performs various functions in the conditions designated through the dialog with the user or in the conditions the dialog apparatus has proposed and the user has agreed, the functions performed can be said to be those of application.

In the above description of the embodiments, the functions of the application are described as if performed only once to solve the problem concerning each topic. "Topics" in the definition of the embodiments aim at "effectively performing the functions of the application". Hence, the problem concerning any topic will be regarded as not solved yet unless the results of performing the functions have any significance (because no items have been retrieved or too many items have been retrieved). In this case, the condition in which the functions should be performed is changed, and the functions of the application may be performed several times. These conditions may be changed through the dialog or automatically by the dialog apparatus. Alternatively, necessary functions may be performed during the dialog over a specific topic, in order to continue the dialog with the user.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A dialog apparatus comprising:
a dialog unit configured to perform a dialog with a user and to collect a plurality of items to be referred to in accordance with the dialog as the dialog continues;
a dividing unit configured to divide the items into normal items related to any usable application and unusable items related to any unusable application;
a managing unit configured to manage the normal items and the unusable items which the dialog unit refers to during the dialog with the user;
a detecting unit configured to detect whether or not one of the normal items managed by the managing unit is changed to be unusable, and to change the one of the normal items into an unusable item; and
a referring unit configured to refer to the managing unit in accordance with the items collected by the dialog unit and to determine to output a use-disapproval notice when it is determined that the collected items include at least one unusable item related to an unusable application,
wherein the dialog unit outputs the use-disapproval notice based on a result determined by the referring unit.

2. The apparatus according to claim 1, wherein the detecting unit manages a configuration of applications designated during the dialog with the user and the changed one of the managed items results from a change in the configuration of the applications.

3. The apparatus according to claim 1, wherein the referring unit selects an item for which the use-disapproval notice is to be output, and the referring unit causes a data amount of the use-disapproval notice to fall below a value.

4. The apparatus according to claim 1, wherein the referring unit selects an item for which the use-disapproval notice is to be output in accordance with a state in which the item has been used.

5. The apparatus according to claim 1, wherein the referring unit determines to output the use-disapproval notice when the items collected by the dialog unit and referred to in accordance with the dialog as the dialog continues are exclusively unusable items.

6. The apparatus according to claim 1, wherein the detecting unit deletes, from the managing unit, an item for which the use-disapproval notice has been output.

7. The apparatus according to claim 1, wherein the dialog unit refers to a plurality of states in which the unusable items have been used and designates an item in accordance with the states, and the detecting unit deletes the designated item from the managing unit.

8. The apparatus according to claim 1, wherein the dialog unit further comprises a receiving unit configured to receive an oral input from the user, the managing unit stores speech-recognition grammars in association with the items, the dialog unit recognizes the oral input from the user in accordance with the speech-recognition grammars, and the referring unit outputs the use-disapproval notice based on recognition results.

9. The apparatus according to claim 8, wherein the detecting unit deletes a part of the speech-recognition grammars from the managing unit.

10. The apparatus according to claim 8, wherein the detecting unit deletes a part of the speech-recognition grammars from the managing unit, the part being associated with an item for which the use-disapproval notice has been output.

11. The apparatus according to claim 8, wherein the dialog unit refers to a plurality of states in which the unusable items have been used and designates, in accordance with the states, an item which is associated with a part of the speech-recognition grammars, and the detecting unit deletes the part from the managing unit.

12. The apparatus according to claim 1, further comprising a formulating unit configured to formulate a plurality of use-histories of users, each use-history being a use-history of each of the items, to extract an unusable item unusable at present in accordance with the formulated use-histories, and to transfer the extracted unusable item to the managing unit, the unusable item being managed in the managing unit.

13. The apparatus according to claim 1, wherein the managing unit classifies the items into categories, and the referring unit outputs the use-disapproval notice for the items of a category when all items of the category are unusable.

14. The apparatus according to claim 1, wherein the managing unit further stores a plurality of substitute items managed in association with the items, and the referring unit outputs one of the substitute items associated with an item when a use-disapproval notice is output for the item.

15. The apparatus according to claim 1, wherein the items are topics.

16. The apparatus according to claim 1, wherein the items are values.

17. A dialog method comprising:
preparing a dialog apparatus including a managing unit configured to manage normal items and unusable items that are referred to during a dialog with a user and are divided into the normal items related to any usable application and the unusable items related to any unusable application, and a detecting unit configured to detect whether or not one of the normal items managed by the managing unit is changed to be unusable, and to change the one of the normal items into an unusable item;
achieving a plurality of aims concerning the items referred to in accordance with the dialog as the dialog continues;
collecting items to be referred to in accordance with the dialog as the dialog continues;

referring to the managing unit in accordance with the collected items; and determining to output a use-disapproval notice when it is determined that the collected items include an unusable item related to an unusable application.

18. A non-transitory computer readable storage medium storing instructions of a computer program for controlling a dialog apparatus including a managing unit configured to manage normal items and unusable items that are referred to during a dialog with a user and are divided into the normal items related to any usable application and the unusable items related to any unusable application, and a detecting unit configured to detect whether or not one of the normal items managed by the managing unit is changed to be unusable, and to change the one of the normal items into an unusable item, the computer program that when executed by a computer results in performance of steps comprising:

achieving a plurality of aims concerning the items referred to in accordance with the dialog as the dialog continues;

collecting items to be referred to in accordance with the dialog as the dialog continues;

referring to the managing unit in accordance with the collected items; and determining to output a use-disapproval notice when it is determined that the collected items include an unusable item related to an unusable application.

* * * * *